United States Patent [19]
Shurtleff

[11] Patent Number: 5,286,349
[45] Date of Patent: Feb. 15, 1994

[54] APPARATUS FOR RECLAIMING USEFUL OIL PRODUCTS FROM WASTE OIL

[76] Inventor: Edward C. Shurtleff, R.R. #1, St. George, N.B., Canada, E0G 2L0

[21] Appl. No.: 712,775

[22] Filed: Jun. 10, 1991

Related U.S. Application Data

[63] Continuation-in-part of Ser. No. 246,834, Sep. 20, 1988, abandoned.

[51] Int. Cl.⁵ .................. C10G 7/00; C10G 7/12
[52] U.S. Cl. .................... 196/46; 196/98; 196/116; 196/132; 196/135; 196/138; 196/141
[58] Field of Search .......... 196/46, 98, 116, 132, 196/135, 138, 141; 137/428; 210/128, 129, 180

[56] References Cited

U.S. PATENT DOCUMENTS

| | | | |
|---|---|---|---|
| 1,310,874 | 7/1919 | Reilly | 196/116 |
| 1,459,515 | 6/1923 | Penniman | 196/132 |
| 1,650,887 | 11/1927 | De Florez | 196/132 |
| 1,831,875 | 11/1931 | Moreton . | |
| 2,012,695 | 8/1935 | Shillaber | 196/46 |
| 4,233,140 | 11/1980 | Antonelli et al. . | |
| 4,381,992 | 5/1983 | Wood et al. . | |
| 4,452,671 | 7/1984 | Oakes . | |
| 4,457,805 | 7/1984 | Pastor . | |

FOREIGN PATENT DOCUMENTS

| | | |
|---|---|---|
| 360500 | 3/1990 | European Pat. Off. . |
| 712748 | 10/1941 | Fed. Rep. of Germany . |
| 90/09426 | 8/1990 | PCT Int'l Appl. . |

OTHER PUBLICATIONS

Technical Encylcopaedia, SNTL Praha 1, 1981 (Doc. 5).
Newspaper Article: Undated-name of publication unknown, entitled "Boundless potential for invention which turns waste oil into fuel" by Reed Haley, Staff Writer; inventor's picture on sheet captioned Liquid Gold-Ed Shurtleff and his amazing mini refinery....
Newspaper Article: Hand written name of publication "Telegraph Journal-Mar. 1 1989" entitled His machine converts waste oil into usable diesel-type fuel; inventor's picture captioned Likes Results-Ed Shurtleff, inventor of a machine that turns waste oil into diesel-type fuel....
Newspaper Article: Undated photocopies of two articles on one sheet: name of publication unknown, one entitled "Award-Winning Inventor Says" Inventing Akin to Having A Baby and Shurtleff Wins Award-both articles written by Sandy Morgan.
Newspaper Article: undated article "Inventor's Refined Idea Is Making Fine Oil" by Mac Trueman, The Evening Times Globe, Saint John (New Brunswick). with inventor's picture captioned Ed Shurtleff with his mini--refinery....
Newspaper Article: Publication and date unknown; article entitled "Waste Oil Refining Unit Approved for sale in United States Market", by Dennis Brooks, Correspondent. Picture of various people with caption A new machine that recycles used motor oils....
Newspaper Article: The Brunswick Business Journal, Oct. 1990 entitled "The Innovators" by Eugene Wales; picture of inventor captioned Ed Shurtleff is an inventor stymied by red tape.
Article published in the Atlantic Business publication, May/Jun. 1989 entitled "Turning Garbage Into Gold-Ed Shurtleff has built a machine..." with two photos of Mr. Shurtleff captioned Ed Shurtleff shows off final....
Newspaper Article: Saint Croix Courier, Tuesday, Nov. 13, 1990, entitled "Shurtleff saluted in House of Commons" by Barb Rayner.

Primary Examiner—Joye L. Woodard
Attorney, Agent, or Firm—Bereskin & Parr

[57] ABSTRACT

Apparatus for reclaiming a useful oil product has an evaporation chamber, including an inlet for the waste oil, and an outlet for the vaporized oil, as a useful oil product. Burners are provided for heating the evaporation chamber to vaporize oil from the waste oil. A pump and a float arrangement are provided for monitoring the level of waste oil in the evaporation chamber, and for pumping additional waste oil into the chamber to maintain the waste oil at a desired level. Continuous operation of the apparatus results in a build up of solid wastes, e.g. heavy metals, in the chamber. After a period of operation, the burners are turned off, and the chamber opened, to enable the solid residue to be removed from the chamber. The vaporized oil can be condensed and collected.

37 Claims, 13 Drawing Sheets

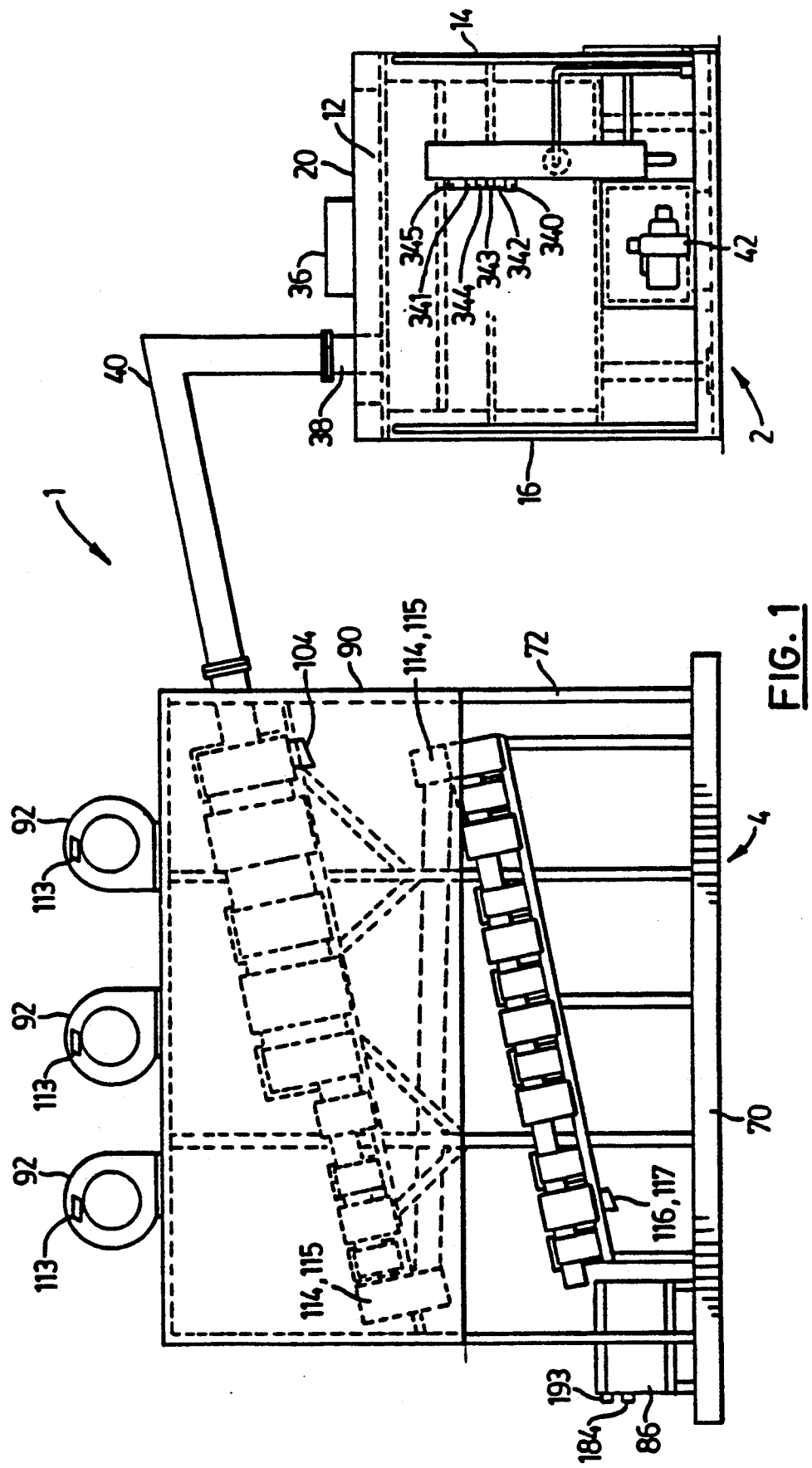

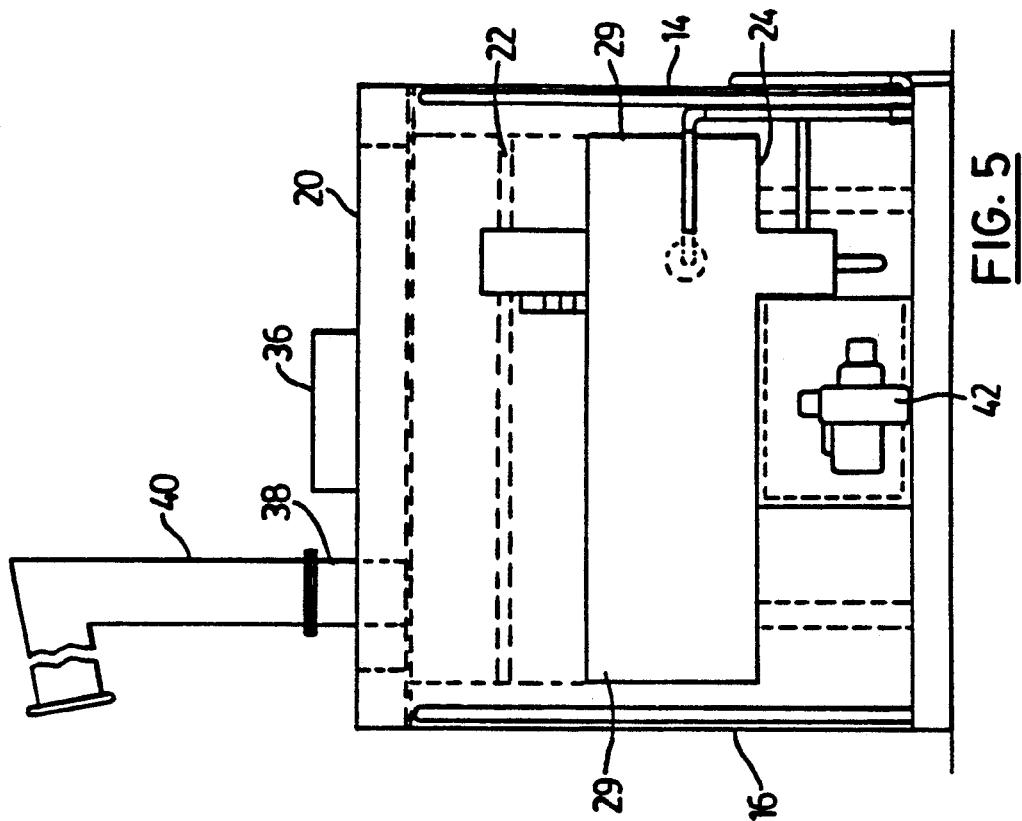
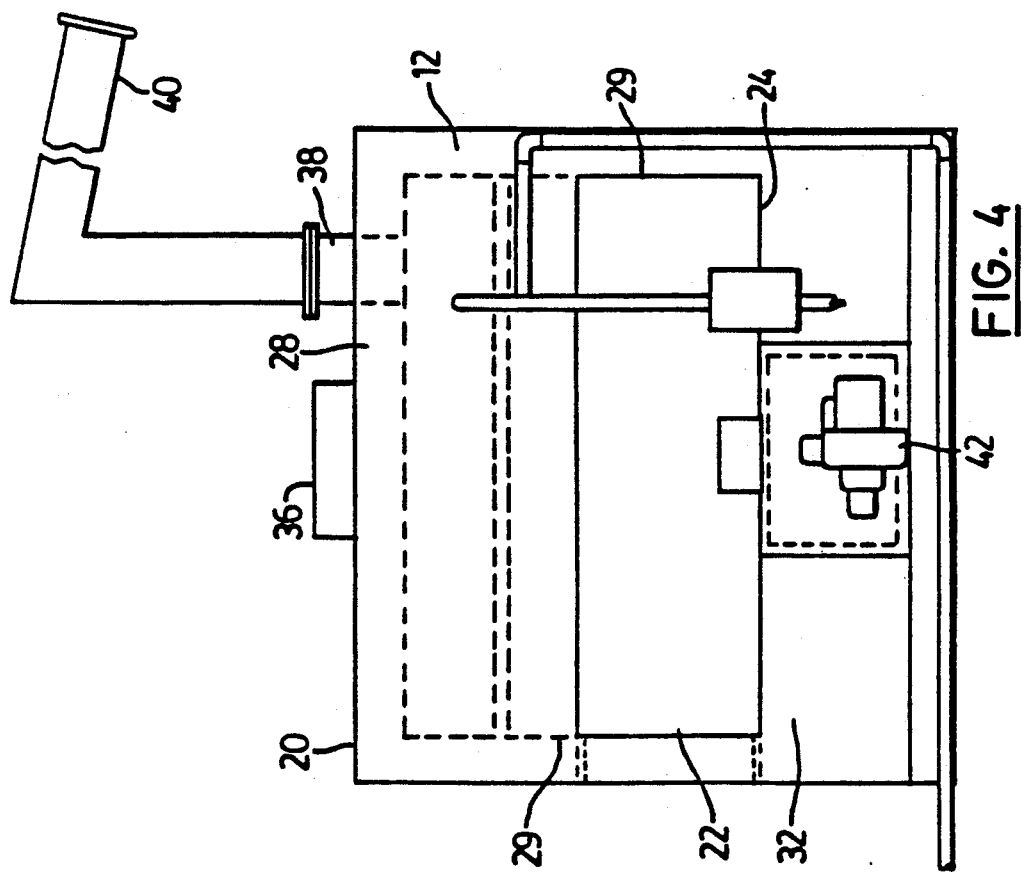

APPARATUS FOR RECLAIMING USEFUL OIL PRODUCTS FROM WASTE OIL

CROSS REFERENCE TO RELATED APPLICATION

This application is a continuation-in-part of my earlier application Ser. No. 246,834 filed Sep. 20, 1988, now abandoned. Further, the contents of that earlier application Ser. No. 246,834 are hereby incorporated by reference.

FIELD OF THE INVENTION

This invention relates generally to an apparatus and a method for reclaiming waste oil, and more particularly relates to reclaiming waste oil from a sludge, i.e. a highly viscous material containing a relatively large amount of contaminants and particulate solids.

In this specification, the term "waste oil" encompasses any suitable oil, for example mineral oils which have been used as motor oil, or some other lubricating oil, or as hydraulic oil or in some other application. It is anticipated that these oils will have been derived from mineral oil, but they could be, for example, animal or vegetable oil, such as fish oil or oil discarded by restaurants, etc. The mineral oil could be plain crude oil. In use, such lubricating oils are usually changed periodically. The drained and recovered waste oil typically contain substantial amounts of contaminants, which may include dirt, metallic particles (including heavy metals, such and molybdenum, chromium, cadmium, vanadium, copper, etc.), oxides and salts, gasoline and gasoline additives (such as tetraethyl lead) as well detergents and performance additives. It may also be contaminated with water. Large quantities of such waste oil are produced in industrialized countries, and my earlier invention was directed to method and apparatus for recovering waste oil, so that it would be suitable for various uses. The contaminants in waste oil usually make it unsuitable for most uses. The term "waste oil" further includes an oil-based sludge such as that produced in the apparatus of my earlier invention described in application Ser. No. 246,834.

My earlier invention provided an apparatus in which the lighter hydrocarbons of the waste oil were volatized and then condensed. Also, whilst the exact mechanism within the apparatus was not fully understood, it is believed that some cracking or splitting of the hydrocarbons from longer to shorter chain molecules occur. Indeed, it is even possible that the contaminants present acted as a catalyst. It was discovered that starting with contaminated, waste lubricating oil, approximately 90% of this could be converted into a lighter oil, suitable for use as a diesel fuel.

The effect of the method or process of my earlier invention was to concentrate the contaminants in the remaining portion or fraction of the original waste oil, e.g. in 10% of the original waste oil. This in effect gives a sludge with a higher concentration of the original contaminants, and which itself poses a disposal problem. It is also to be realized that there are various industries which naturally produce similar sludge or sludge-like materials, which are primarily oil, usually mineral oil, but which are so contaminated with particulate solids etc. that they are too viscous to pass through the apparatus of my original invention.

In view of the high degree of contaminants in such sludges, it is highly desirable to provide some technique of disposing of them. Preferably, this should at the very least significantly reduce the volume of contaminated material for final disposal, and more preferably it should reduce the contaminated material to a form in which it could be more readily reprocessed itself or in a form suitable for disposal.

SUMMARY OF THE PRESENT INVENTION

In accordance with the present invention, there is provided an apparatus for reclaiming a useful oil product from waste oil, the apparatus comprising: an evaporation chamber, including an inlet for waste oil, and an outlet for vaporized oil, as a useful oil product; means for heating the evaporation chamber to vaporize oil from the waste oil; float means for monitoring the level of the waste oil in the evaporation chamber; and pump means for pumping waste oil into the evaporation chamber, and controlled by the float means, to maintain the waste oil level in the evaporation chamber at a desired level.

In accordance with another aspect of the present invention, there is provided a method of recovering a useful oil product from waste oil, the method comprising the steps of:

(1) heating the waste oil in an evaporation chamber, to vaporize oil therefrom, and recovering the oil;

(2) continuously supplying waste oil to the evaporation chamber, to maintain the waste oil at a desired level, whereby the solid contaminants build up in the waste oil in the evaporation chamber; and (3) after a period of time, removing the residue, including the built up solids, from the evaporation chamber.

For certain applications, particularly small uses, a batch operation could be employed. Instead of continuously supplying waste oil and providing floats to monitor the level, etc., a batch of waste oil would be heated in a vessel or chamber, to volatilise the hydrocarbons etc., which would be recovered as a useable fuel oil. This would leave a certain amount of solid contaminants. If desired, the chamber could be refilled and the process repeated. When desired, or as limited by the build of contaminants, the solid contaminants could be removed from the chamber.

For both the continuous or batch process, it is preferred for the oil to be condensed. More preferably, the oil is condensed in an adjacent condensation unit that generates a back pressure of around 0.5 p.s.i. above atmospheric, for example, in the range 0.42-0.46 p.s.i. above atmospheric pressure. It is believed that this pressure elevates the temperature sufficiently to cause a certain amount of cracking of the constituents of the oil, to give a recovered oil that is lighter than the oil present in the input sludge.

The apparatus and method are particularly intended for use with sludge generated by the apparatus of my earlier application Ser. No. 246,834. My earlier apparatus was capable of recovering about 90% of the volume of an original waste oil product, the other 10%, approximately, was left as a sludge, containing high level of contaminants, impurities and solids. The present apparatus and method enable the solid contaminants to be removed, comparable to that produced by my earlier invention. Effectively, the contaminants and solids are further concentrated into an even smaller volume, and, after a final high temperature baking step, are left as a cake-like residue. This can be readily dug out of the evaporation chamber.

Preferably, the waste oil is first put through the apparatus of the present invention, and is then passed through the apparatus of my earlier invention, which cracks the oil to produce a lighter fuel oil. This also considerably increases the throughput through that earlier apparatus.

As detailed below, the concentration of various metals etc. in this cake-like residue is very high, as compared to their concentration in the original waste oil product, and hence it becomes economically feasible to further process this solid residue, to recover the metals and other materials contained in it. Whilst the amount of solid residue produced is small, where large quantities of waste oil are being reprocessed through the apparatus of my earlier invention and the present apparatus, this could ultimately produce a steady flow of solid material which would justify reprocessing.

In the method of the present invention, the vaporized oil that is produced can either be condensed, or for certain applications left in the vaporized state. Thus, it could be combined with other apparatus, where vaporized oil is required, e.g. for combustion purposes.

BRIEF DESCRIPTION OF DRAWING FIGURES

For a better understanding of the present invention, and to show more clearly how it may be carried into effect, reference will now be made, by way of example, to the accompanying drawings which show a preferred embodiment of the apparatus and in which:

FIG. 1 is a side view,

FIG. 4 is a right side view of the apparatus;

FIG. 5 is a left side view of the apparatus;

Figure 7C:
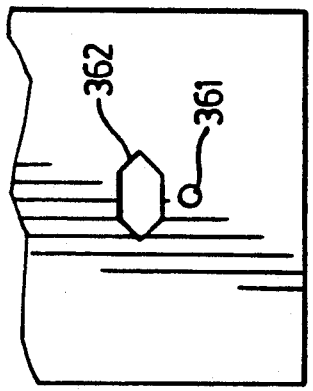
Figure 7D:
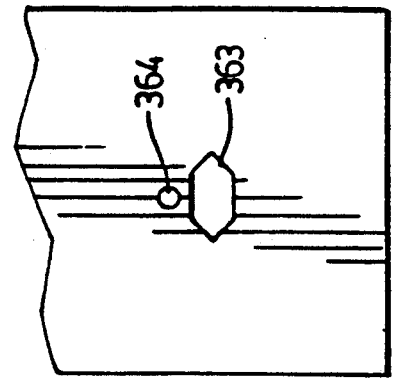
Figure 7A:
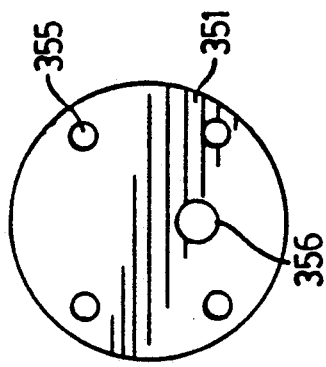
Figure 7B:
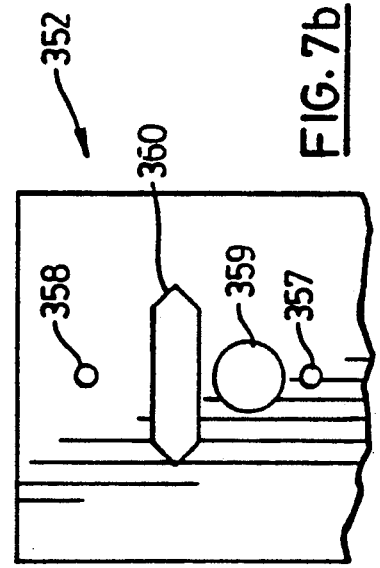
Figure 8:
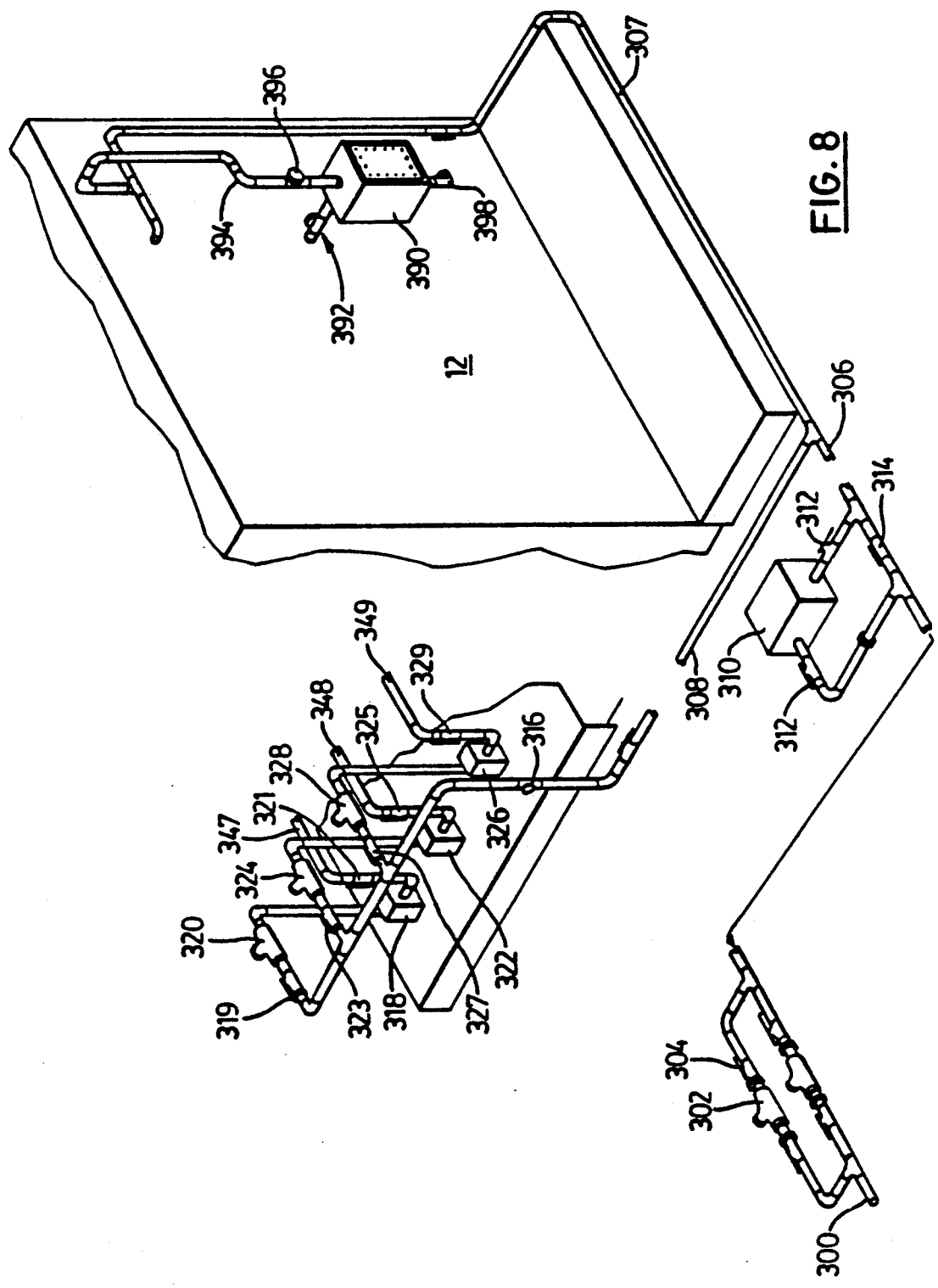
Figure 9C:
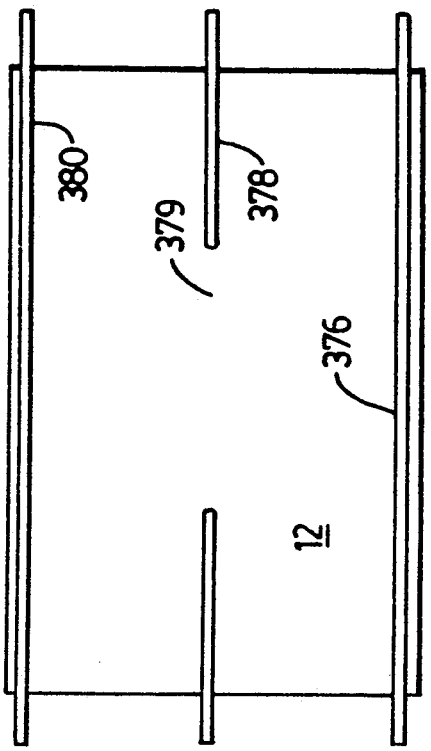
Figure 9A:
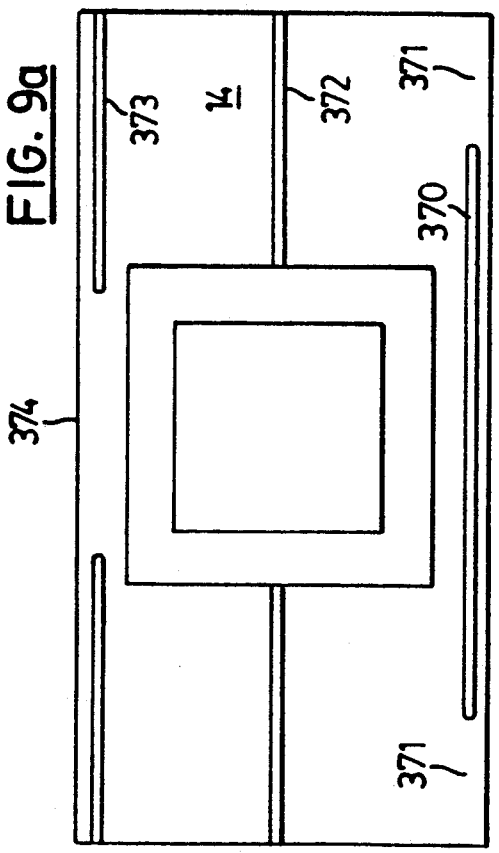
Figure 10:
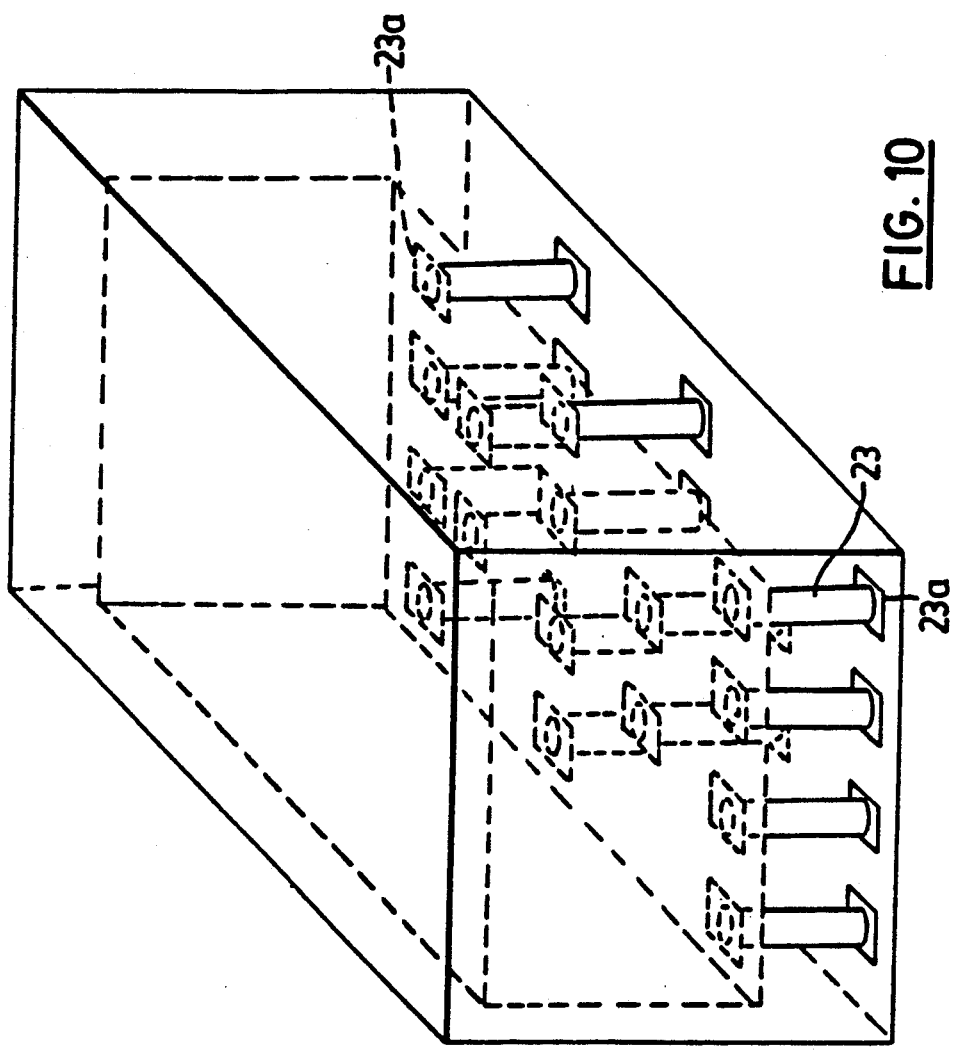
Figure 11A:
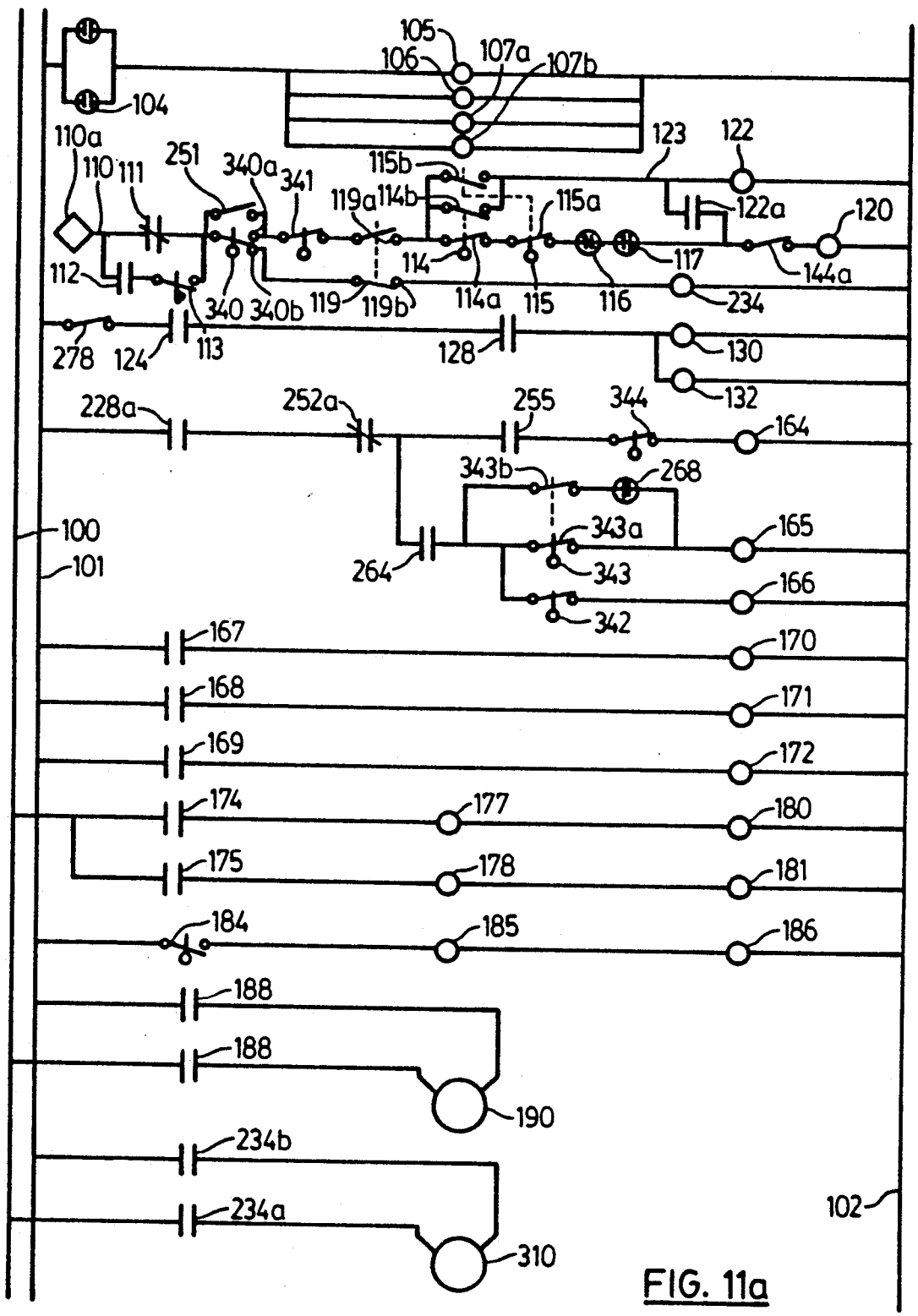
Figure 11B:
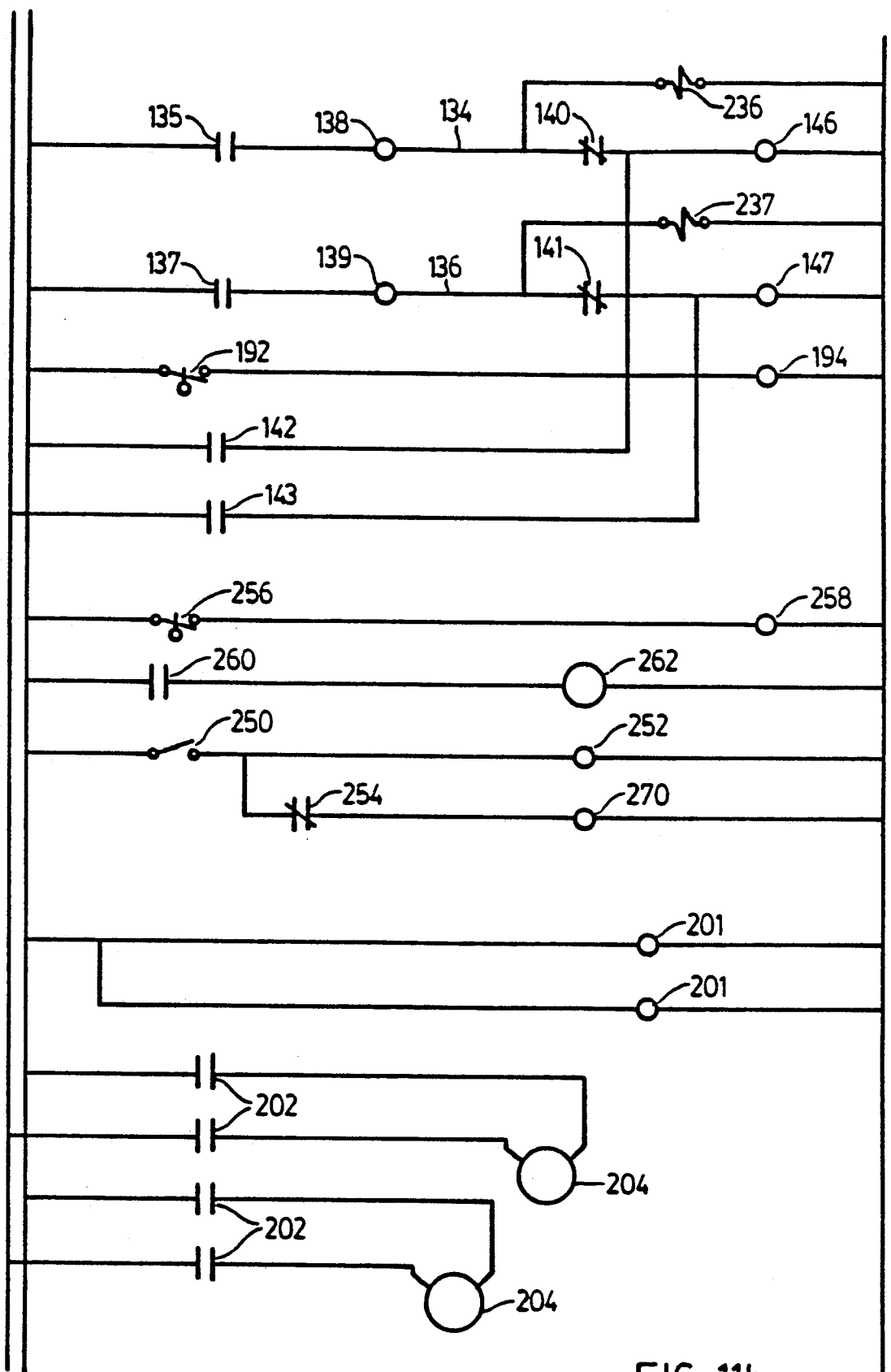
Figure 11C:
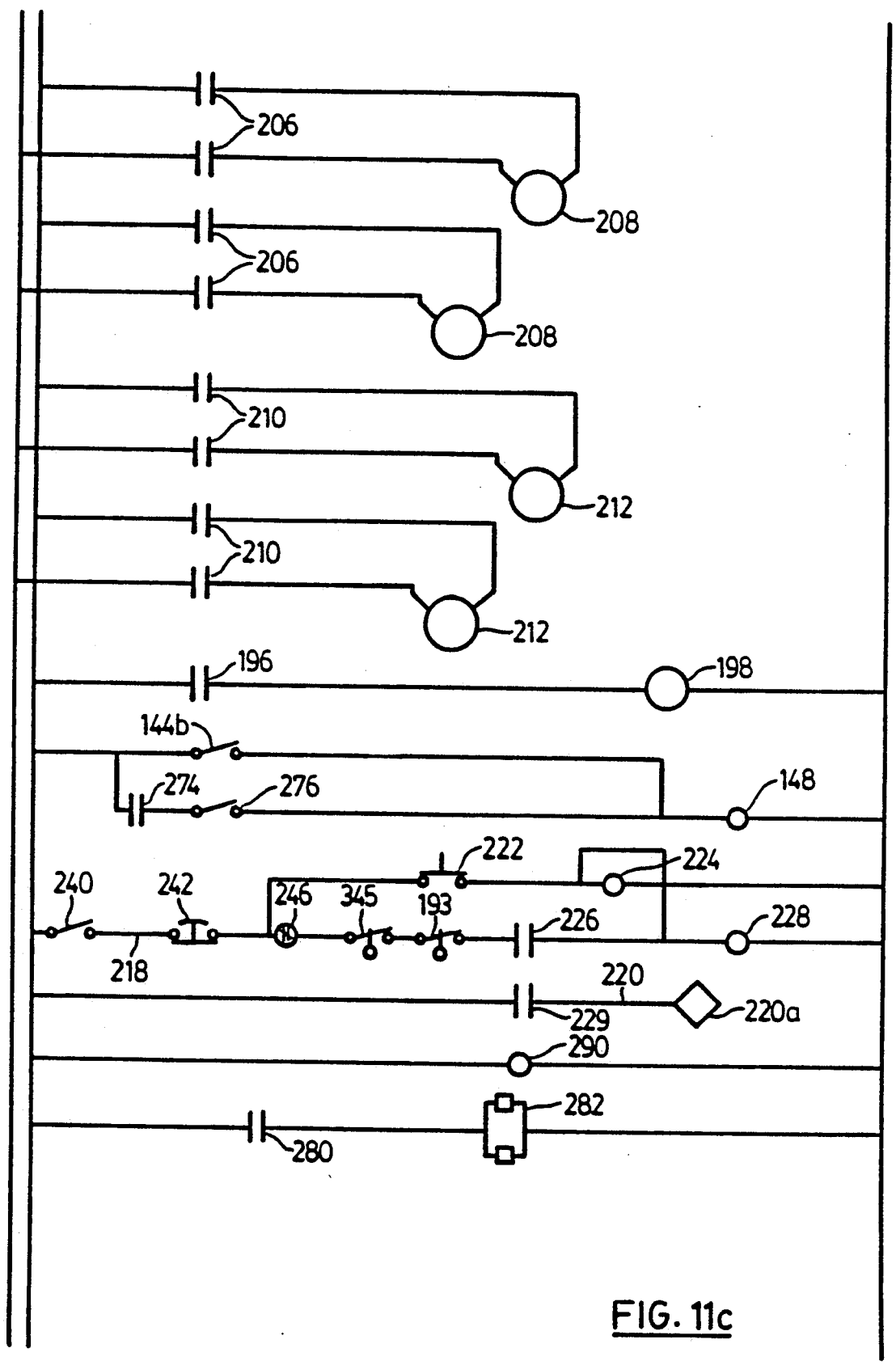

FIGS. 7a, b, c and d shows baffles fitted in the sludge supply system of the apparatus;

FIG. 8 is a perspective view showing a pipe network for supplying sludge to the apparatus;

FIG. 9a, b and c are views of combustion gas baffles of the apparatus;

FIG. 10 is a perspective view showing a support arrangement of the evaporation unit of the apparatus; and FIGS. 11A, 11B and 11C are an electrical schematic of the control circuitry for the apparatus.

DESCRIPTION OF THE PREFERRED EMBODIMENT

FIG. 1 shows an apparatus in accordance with the present invention, generally indicated by the reference 1. The apparatus 1 includes two basic elements, namely an evaporation unit 2 and a condensing unit or heat exchanger 4, which are described in turn below.

Figure 3:
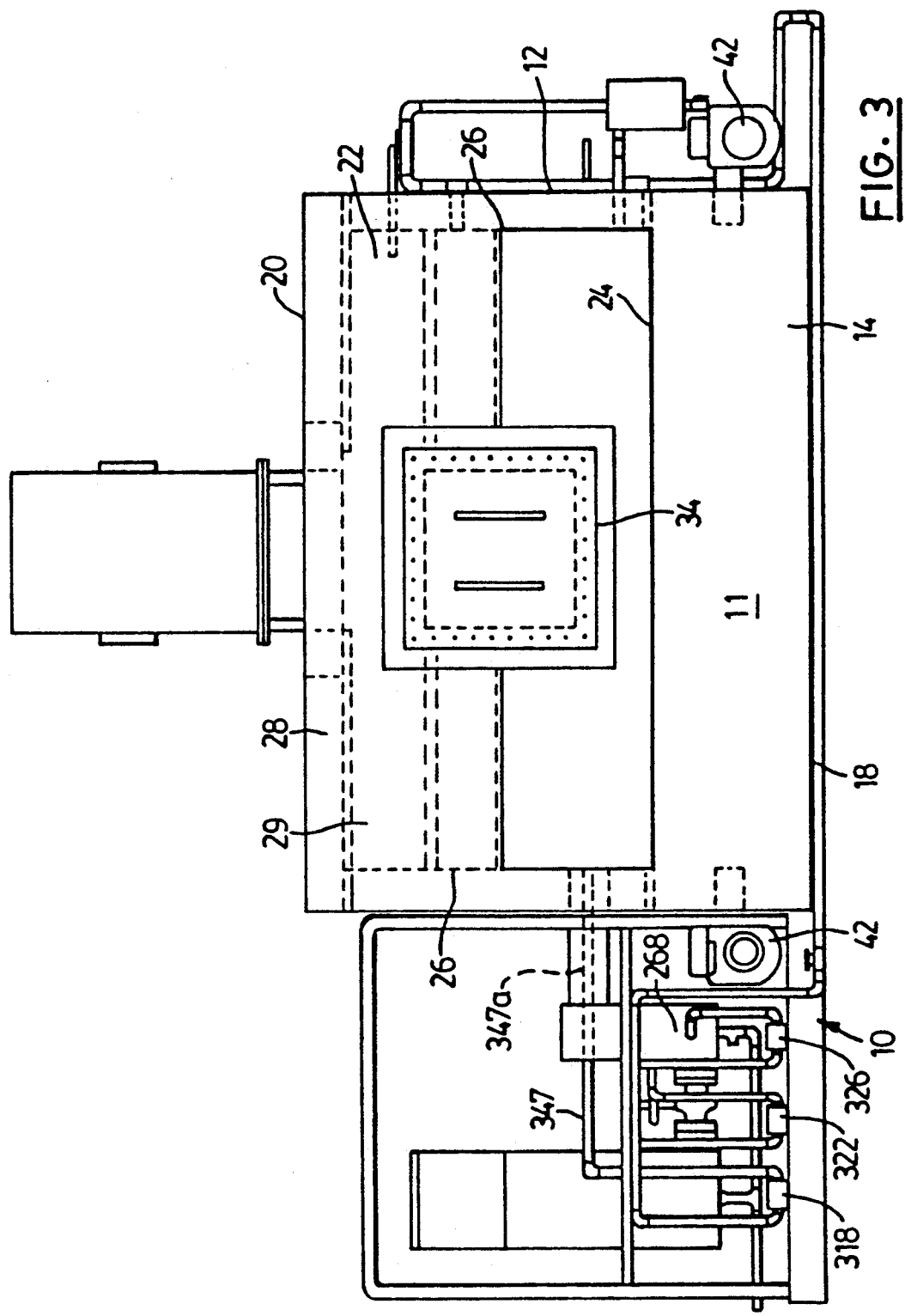
FIG. 3 is a front view of the apparatus.

As shown in FIG. 3, the evaporation unit 2 is of generally rectangular section and has a depth slightly less than its length or width. The evaporation unit 2 has two longitudinal support members 10 for supporting the unit, and facilitating transportation of the unit 2. The unit 2 has a housing 11 including external side walls 12, end walls 14, 16, a bottom wall 18 and a top wall 20. Within the unit 2, there is a waste oil distillation or evaporation chamber 22, which is spaced inwardly from all the outer walls of the unit 2. The chamber 22 is supported on a plurality of support cylinders 23 as shown in FIG. 10, so as to enable free movement of hot gases around the waste oil chamber 22 and within the exterior walls 12 - 20. Each support cylinder 23 is provided with a metal plate 23a at either end, and the chamber 22 is freely mounted on the top plates 23a, to allow for thermal expansion and contraction. The waste oil chamber 22 has a flat bottom 24. The bottom is made from 309 stainless steel. Extending up from this are side walls 26 which connect to a top wall 28. These walls 24, 26, 28 extend up to chamber end walls 29. In one end wall 29 there is a chamber access door 34 for an excess opening, extending through the respective end wall 14 to the chamber 22. As detailed below, the purpose of the door 34 is to enable the solid, cake-like material, left in the chamber 22 after use of the apparatus, to be removed, prior to further use of the apparatus. Appropriate access doors can be provided for the combustion chamber. The chamber 22 also has, in known manner, longitudinal and transverse reinforcing or stay bars, to withstand the internal pressure of a full charge of waste oil.

In the top wall 20, there is an exhaust opening 36 which, although not shown, would be connected to a suitable exhaust stack. For the evaporation chamber 22, an outlet 38 is connected through to a connection duct 40.

At either side of the evaporation unit 2, and mounted on each side wall 12, there is a blower 42 for a respective burner within the combustion chamber 32. Associated with each blower 42 is a fuel supply (not shown) for a suitable fuel. This could be fuel derived from the method of the present invention, or the method of my earlier application, or alternatively some entirely separate fuel source.

Figure 6:
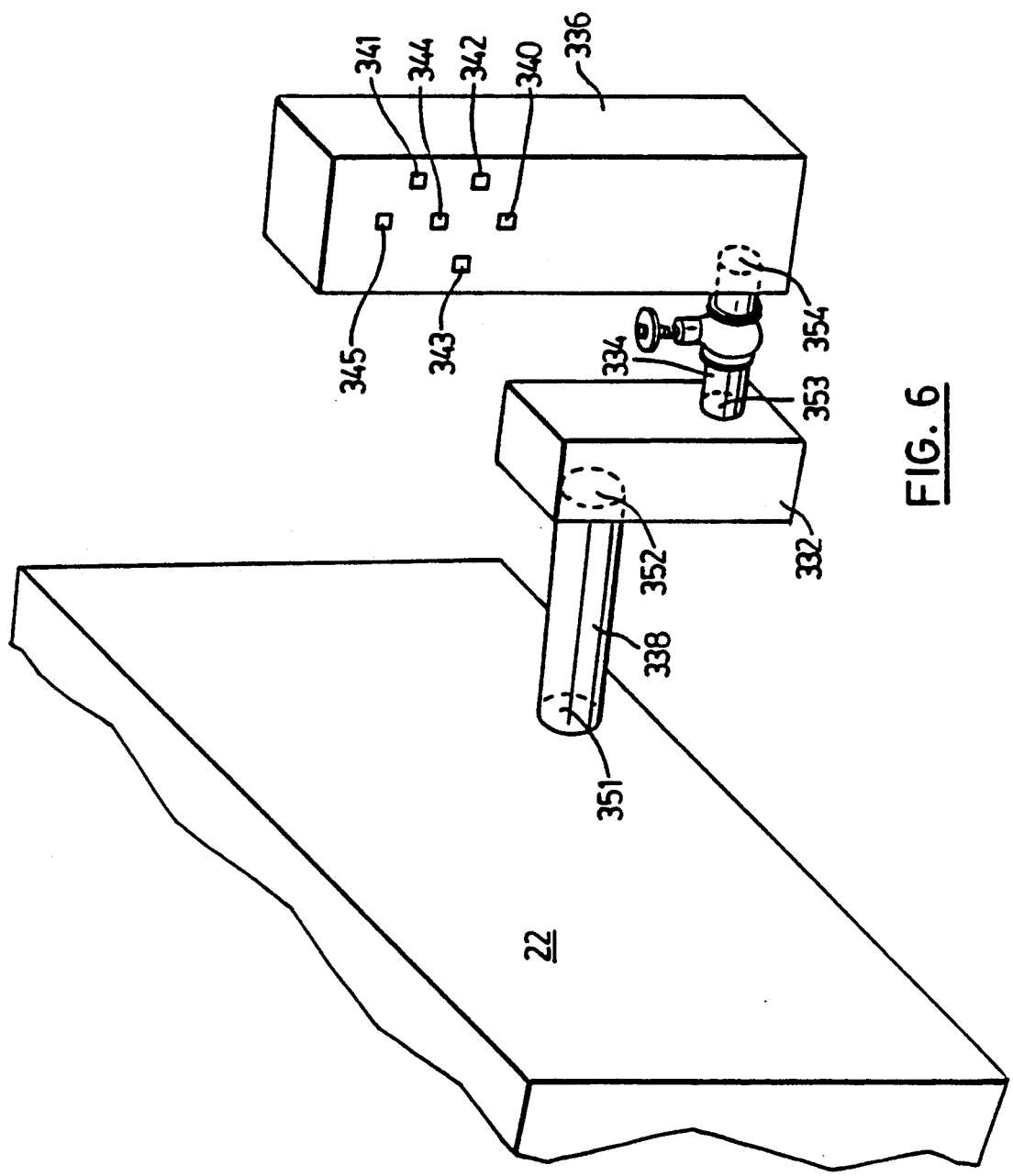
FIG. 6 is a perspective view showing the arrangement of float and service tanks of the apparatus.

As shown in the front view of FIG. 3, the support members 10 extend on one side of the distillation unit 2 at a greater distance then they extend at the other side. This is to accommodate a waste oil supply system providing an inlet for the waste oil. FIG. 6, 7 and 8 show this system and the associated pipe supply network in greater detail.

Referring to FIG. 8, an inlet 300 is connected to a waste oil tank and divides into two lines passing through a pair of 3" strainers 302. The two flows then pass through respective 2" steel ball valves 304. The flow is then recombined in a main inlet conduit 306. The conduit 306 has a first branch 307 connected directly to the evaporation chamber 22, and a second branch 308 connected to a number of supply pumps, detailed below.

Connected in parallel with the supply conduit 306 is a 1½ TEEL pump with a 3 H.P. motor, the pump being denoted by the reference 310 and forming initial supply pump. On either side of the pump 310, there are control valves 312, to enable the pump to be isolated. Correspondingly, there is a valve 314 in the main supply conduit 306, for closing that conduit when flow is to pass through the supply pump 310.

The second branch 308 continues through a 2" check valve 316, and is then connected through to a ½ GPM pump 318, a 1½ GPM pump 322, and a 2 GPM pump 326. The connection to the pumps 318, 322 and 326 are through respective 1" steel ball valves 319, 323 and 327, and through respective 1½" strainers 320, 324 and 328. The three pumps 318, 322 and 326 have outputs, with respective 1" steel ball valves, 321, 325 and 329, connected to a service tank 332 (FIGS. 3 and 6) by respective pump supply pipes 347, 348 and 349.

The service tank 332 is connected by first connection pipe 334, comprising a 3" diameter pipe with a steel gate valve (not shown) to a float tank 336. A second connection pipe 338 is a 6" diameter pipe and connects the service tanks 332 to the chamber 22.

The float tank 336 is fitted with six floats, which are detailed below in relation to the electrical control circuit. The lowermost float is a low level float switch 340. Above this is a burner circuit safety float 341. Above the float 341, there are three floats 342, 343 and 344 for activating the 2 GPM pump 326, the 1½ GPM pump 322 and the ½ GPM pump 318, respectively. Finally, an uppermost float switch 345 is a high level safety float.

To control supply of the oil, and prevent surges in the oil supply, a variety of baffles are provided between the service tank 332, float tank 336 and chamber 22. These will now be described with reference to FIG. 7. Many of these baffles are configured to prevent or at least reduce convective heat transfer between two bodies of oil of different temperatures. In particular, a first baffle is designed to minimize convective heat transfer between relatively hot oil in the chamber 22 and relatively cool oil in the first connection pipe 338.

As shown in FIG. 7a, the first baffle 351 is provided at the inlet to the chamber 22, and a second baffle 352 where the service tank 332 flows into the pipe 338. Similarity, third and fourth baffles 353 and 354 are provided at either end of the second connection pipe 334 adjacent the service and float tank 332, 336 respectively.

FIG. 7a shows the first baffle 351, which is generally circular with a diameter of 6". It has four ⅜" diameter holes around the outside indicated at 355 and a hole or aperture 356 offset from the centre. This aperture 356 is for an extension 347a of the pump supply pipe 347, which continues at 347a through the service tank and second connection pipe 338 into the chamber 22.

The second baffle 352 is provided at the top of the wall of the service tank 332. At the bottom and top, it includes a drain hole 357 for liquid and a vent hole 358 for vapour, both having a diameter of ¼". Above the drain hole 357, there is an aperture 359, again for the extension pipe 347a. Above this there is a level port 360 which has a horizontal width 3" and a height of 1".

The third baffle 353 into the service tank 332 from the connection pipe 334 is shown in FIG. 7c and includes a ¼" diameter drain hole 361 and a level port 362. The level port, again, has a height of 1" but here it has a horizontal width of 2". It is expected that oil flow or level adjustment will occur primarily through the level port 362, as for the other level ports.

Correspondingly, the fourth baffle plate 354, shown in FIG. 7d, has a level port 363 with the same dimensions as the level port 362, and above this a ¼" diameter vent port 364.

The pumps 318, 322 and 326 are connected by respective pump supply pipes 347, 348 and 349 to the service tank 332. The pipes 348 and 349 open directly into the service tank, whereas as detailed below, the pump supply pipe 347 continues at 347a into a pipe leading directly into the chamber 22. This enables a steady slow supply of cool oil to be fed into the chamber 22, to prevent a backflow of hot oil into the supply and service tanks, etc.

Reference will now be made to FIG. 9, which shows an arrangement of combustion baffles within the housing 11.

FIG. 9a shows the baffle assembly inside the front end wall 14. A front lower flow deflector or baffle 370 has openings 371 at either end to permit flow of hot exhaust or combustion gases upwards. A front middle flow deflector 372 is continuous and forces the exhaust gases to flow to the sides. The front top deflector 373 has a central opening 374 as indicated.

The side walls 12 are similar as shown in FIG. 9c. Here, a lower side flow deflector 376 is continuous. A central side flow detector 378 has a central opening 379, and again a side top flow deflector 380 is continuous.

Figure 9B:
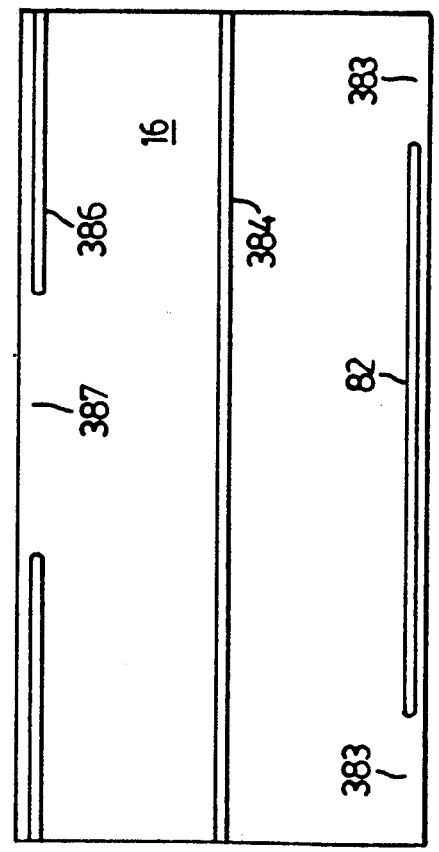

Reference now be made to FIG. 9b, which shows the flow detector within the rear end wall 16, which generally correspond with those for the front end wall 14. A lower flow deflector 382 has openings 383 at either end, corresponding to the openings 371. A central middle flow deflector 384 is continuous, and an upper flow deflector 386 has a central opening 387.

Thus, in use, combustion or exhaust gases from the two burners can flow upwards through the opening 371, 383 at the front and back to a space above the lower flow deflectors. The gases are then deflected from the front and back to the sides of the chamber 22 and up through the openings 379, into the space between the middle and upper flow deflectors. The gases then have to travel back around to the front and back of the chamber 22, before exiting through the openings 374, 384. This arrangement ensures that exhaust gases travel a relatively long path and permits heat transfer between the hot combustion gases and the chamber 22. Exhaust gases then travel across the top of the chamber 22 to the exhaust stack opening 36.

To permit evaluation of the state of the contents of the chamber 22, a drainage tank 390 is provided connected via a 2" gate valve 392 to the chamber 22. It is also connected by a vent line 394 including a valve 396 to the branch line 307. Drainage tank 390 has an outlet valve 398, and the operation of the drainage tank 390 is described below.

Turning to the condensation unit 4, this similarly has a pair of support members 70, for supporting the unit for and facilitating transportation thereof. It includes a framework 72 which supports an array of condensation or heat exchange pipes, generally indicated by the reference 74.

The structure of the condensation pipes 74 is deliberately kept simple, whilst providing a large heat transfer surface in order to avoid problems associated with complex designs, e.g. complex fin configurations. Thus, the condensation pipes comprise a plurality of transverse ducts 76 arranged in two inclined layers indicated at 78 and 82. The layers 78 and 82 are generally similar, although the size of the ducts varies between the layers. The front layer includes a first section 79 of larger ducts and a second section 80 of smaller ducts, similar to the second layer 82. The reason for this is that in the first section 79 there is a greater percentage of vapour present requiring a larger volume. Otherwise the arrangement in the various layers is generally similar and is described in relation to the top layer 78.

Figure 2A:
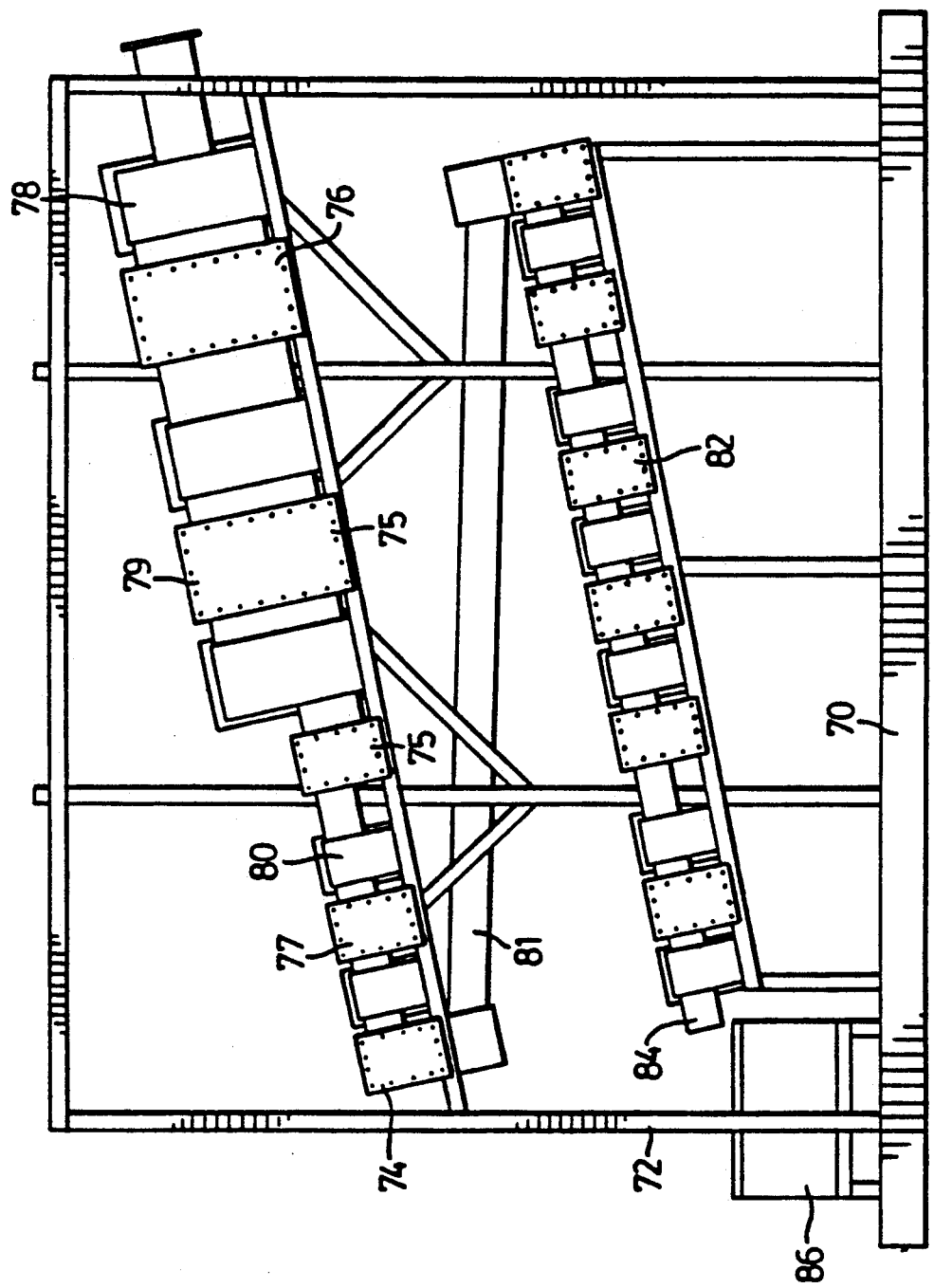
FIGS. 2a and 2b are side views on an enlarged scale, of the heat exchanger of the apparatus of FIG. 1.
Figure 2B:
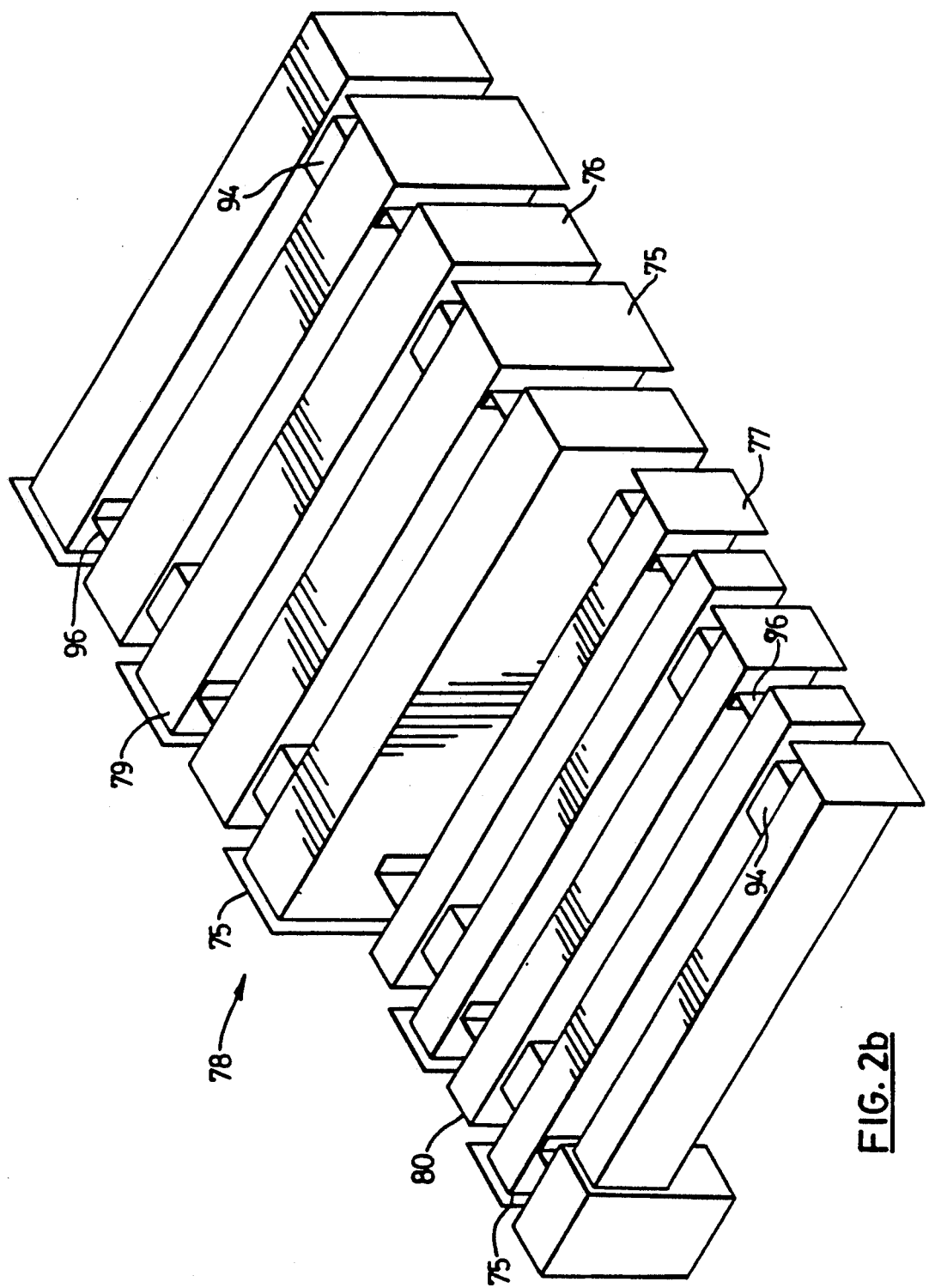

In the first section 79 of the top layer 78, there is the larger size ducts 76 and smaller ducts 77 in the second section 80. These ducts 76, 77 extend transversely, i.e. perpendicularly to the plane of FIG. 2. The ducts 76, 77 are each provided with one access plate 75 which are provided at alternate ends of the ducts. Only the access plates on one side are shown in FIG. 2. Alternate ends of the ducts 76, 77 are connected through to one another, so as to give a meandering or zig zag path. In other words, vapour entering the uppermost duct 76 from the connection duct 40 will flow to one end of that duct, and then through to the next transverse duct 76. The vapour then travels along the length of that duct 76 before flowing down to the next transverse duct 76, and so on. A connection pipe 81 is provided between the layers of duct 78, 82. Consequently, the vapour flows in a zig zag or sinuous path through the ducts 76, 77 and the top layer 78 and then through the connection pipe 81 to the upper end of the layer 82 where the process is repeated, this layer comprising solely smaller ducts 77. The bottom layer 82 ends in an outlet 84 for recovered oil, which is collected in a collection tank 86. This tank is fitted with a float switch, for limiting the level of recovered oil in the tank 86, as detailed below.

The top layer 78 is enclosed within a housing 90 (FIG. 1). On top of the housing, there are six individual fans 92 arranged for drawing air from the ambient atmosphere and blowing it over the layers of ducts 78, 82. Thus it will be seen that the flow of cooling air, to effect condensation of the vapour is effectively in the same direction as the vapour flow.

In use, any water vapour present is condensed in the heat exchange ducts. Small drainage taps (not shown) are provided for this and corresponding drainage channels lead to a water collection tank (also not shown). If large quantities of water are generated, a removal pump can be provided, and the water can be treated in a water/oil separator.

Turning to the electrical circuit shown in FIGS. 11a, 11b and 11c, in known manner this includes three supply lines 100, 101, 102 of a conventional supply with two phases and neutral. FIGS. 11a, 11b and 11c show various elements, which are not specifically itemized on FIGS. 1-3, and which are described below in the order in which they appear in those figures. These various elements interact to form a control circuit as described below.

In a first line there are a pair of snap disks 104, mounted on the heat exchanger or condensing unit 4, arranged in parallel for controlling power supply to four control relays 105, 106 and 107a and 107b. The snap disks 104 close when the temperature reaches a predetermined level, here 130° F. When the temperature exceeds 130° F. at least one snap disk 104 closes to activate the relays 105, 106 and 107a, b and hence turn the fans on, as detailed below.

Relay 105 provides a control for the burner circuit and is intended to prove cooling air flow on the heat exchangers. Relay 106 controls the power supply to timers, detailed below, for delayed cooling fan start up. Relay 107a controls other cooling fan motors and relay 107b controls supply pumps and a bake circuit.

A line 110 includes a burner circuit with various elements in the line. There are two pairs of contacts 111 and 112 of the relay 105. The contacts 111 are normally closed whilst the contacts 112 are normally open. The contacts 112 are in series with sail switches indicated at 113 which detect the air flow through the condensation unit or heat exchanger 4. Thus, when the fans are turned off, the sail switches 113 are bypassed whilst power is routed through the sail switches 113 when the fans are operative. With sufficient air flow, the sail switches 113 are closed. Thus, when the relay 105 is activated, the contacts 111 are opened and the contacts 112 closed to route power for the burner circuit through the sail switches 113. Consequently, power will only be supplied if the sail switches 113 remain closed indicating adequate air flow.

The float switch 340 is a low level float switch, in series in the burner circuit, which detects the waste oil level in the chamber 22. It enables operation of the burners once a certain minimum or lower waste oil level is reached as indicated at 340a. Until this level reached it is switched to 340b enabling a further relay 234, which controls the supply pump 310.

The connection at 340a is to the burner circuit safety float 341, which ensures that the waste oil does not exceed a certain level for safe operation of the burners. In use, sudden boiling off of water or certain fractions can cause oil to back up into the float and safety tanks. This float switch 341 shuts off the burners until this action dissipates.

A bake or override switch 251 can override the low level float switch 340. Also, a supply pump lock out key switch 119 is provided, for controlling the supply to the burner circuit. When activated it energises the burner circuit at 119a and locks out the supply pump control circuit at 119b.

The supply pump 310 provides for rapid filling of the apparatus, and for safe operation of the burners, it is locked out so supply comes from lower capacity pump only.

Two flow control float switches 114, 115 are mounted on an intermediate float chamber to the lower layer 82 of the heat exchanger. The switches 114, 115 are intended to detect a surge in the flow of condensates, which typically occurs during the initial start up, when volatiles are rapidly displaced from the chamber 22. The intermediate float chamber has an orifice sized for a certain flow rate. If this flow rate is exceeded, then the level in this float chamber rises, switching at least one of the float switches 114, 115. A line 123 including a timer 122 connects this inlet chamber to the inlet chamber of the bottom layer 82. The timer 122 controls contacts 122a. Each switch 114, 115 includes, in the line 110, a respective contact pair 114a, 115a, which in an open configuration prevent the burner operating. When closed, the switches 114, 115 result in the burner circuit being controlled by a temperature controller, detailed below. When a surge in output is sensed by the float switches 114, 115, control of the burner is switched through to the timer 122.

On the heat exchanger ducts 77, snap disks 116, 117 are provided, as a backup for the temperature controllers. If one of these snap disks is open, the burners will not operate. Provided the temperature is below a set level, namely 130° F., the heat exchange temperature is controlled by the temperature controller.

The snap disk 117 is in turn connected to a burner circuit control relay 120. The relay 120 controls contacts 124 for the burners. When energized, the relay 120 closes this contact pair, to enable the burners to start.

Thus, the overall operation of the switches 114, 115, is to interrupt normal burner operation if excess liquid or condensate level is detected. If at least one contact pair 114b, 115b is closed, control is passed to the timer 122. The burners are shut down repeatedly for a certain predetermined time, by the timer 122. This allows time for the excess liquid to drain from the condensation unit 4, whilst not shutting down the distillation unit 2 for such a long time that it cools significantly which in turn would slow restarting of production.

An override switch 144 is provided in the burner circuit, having contact pairs 144a, 144b. Contact pair 144a opens the burner circuit, whilst contact pair 144b provides an override to a blower control relay (FIG. 11C). Switch 144 is manually operated, with contacts 144a being normally closed and contacts 144b normally open.

For the burners, there is a temperature controller 128 connected to control relays 130, 132. A contact pair 124 of relay 120 and a bake timer switch 228 (detailed below) are in series with the temperature controller 128.

Correspondingly, for each of the first and second burners, associated with the blowers 42, there is a circuit 134, 136. Circuit 134 includes a pair of contacts 135 of the relay 130, whilst the circuit 136 includes a pair of contacts 137 of the relay 132. Each of these circuits 134, 136 includes a respective CAD flame detector 138, 139, which in turn are connected to respective pairs of normally closed contacts 140, 141 of a relay 148. The outputs of the flame detectors 138, 139 are also connected to respective delayed oil valves 236, 237, which delay the oil flow until the pump and the blower are up to pressure.

The contacts 140, 141 are connected to respective blower motors 146, 147, for the blowers 42, for supplying power thereto.

In normal use when the burner circuit control relay 120 is activated, the contact pair 124 closes activating the relays 130, 132, as controlled by the temperature controller 128. The relays 130, 132 in turn close the contact pairs 135, 137 to activate the blower motors 146, 147.

A blower override circuit (FIG. 11c) includes contacts 144b of the override switch 144 and the override relay 148. The relay 148 includes the pairs of contacts 140, 141, and also additional contact pairs 142, 143. In use, with the switch 144 closed, the relay 148 is actuated, to close the contact pairs 142, 143, whilst simultaneously opening the contact pairs 140, 141, so that power is supplied directly to the blower motors 146, 147, overriding other control elements.

The supply pump control circuit includes a supply pump control relay 234. The 3 HP. supply pump 310 is controlled by two pairs of contacts 234a, b of the supply pump control relay 234. The pair of contacts 119b are closed, to enable the apparatus to be filled. This activates relay 234, in turn activating the supply pump 152. When the required minimum level is reached, the low level float switch 340 opens contacts 340b and closes contacts 340a. Power is then cut off to the pump 310, and additional pumps can take over when switch controls 119a are closed.

A pair of contacts 228a of a control relay 228, detailed below, control power supply to other pump motors. The contact pair 228a is connected through another contact pair 252a, which is normally closed. The contacts 252a are controlled by control relay 252, which in turn is activated by bake mode switch 250. Thus, in normal operation, the relay 252 is not actuated, leaving the contact pair 252a closed. For bake operation, the relay 252 is activated, to open the contact pair 252a thereby cutting off power to the supply pumps.

The contact pair 252a in turn is connected through a temperature alarm 255, whose function is to start the ½ GPM pump motor, when the temperature exceeds a preset limit, here 200° F. It has been found that if the initial charge of waste oil contains a lot of water, there can be a considerable time period, e.g. one hour, while this water is being boiled off. During this time to prevent back flow of hot oil in the supply system, the ½ GPM pump is activated, at a temperature below the boiling point of water. Condensate collected during this period can be separated from subsequent condensate. The alarm 255 is in turn connected to the float switch 344 for a half gallon per minute pump motor, to ensure the chamber is not overfilled. This in turn is connected to a relay 164 controlling contact pairs 167, to supply power to the half gallon per minute pump 170.

The normally closed contact pair 252a is also connected through the pair of contacts 264 of the relay 107b. This supplies power to circuits controlling the 1½ GPM and 2 GPM pump motors.

The float switch 343 comprises first and second contact pairs 343a, 343b connected directly through to a respective relay 165. The second contact pair 343b is connected through a snap disc 268, and opens at a higher level. If a high temperature is sensed by snap disc 268, it activitates pump motor 171, to keep the service tank cool.

A control circuit for a 2 gallon per minute pump includes a float switch 342 and respective relay 166.

Relay 165 controls contact pair 168 whilst the relay 166 controls contact pair 169. These contact pairs in turn control power to the pump motor 171 for the 1½ GPM pump 322 and 172 for the two GPM pump 326.

The relay 106 has two contact pairs 174, 175, for starting timers 177, 178, which are set respectively for periods of four seconds and eight seconds. The purpose of these timers is to provide a delay for the starting of the fans 92, for the heat exchanger or condensing unit 4. The timers 177, 178 control respective relays 180, 181.

A refined fuel, or recovered oil, float switch 184, mounted on tank 86, is connected to a recovered oil control relay 186 via an on-delay timer 185, which prevents too frequent cycling of the pump. This relay 186 in turn has contact pairs 188 that control a pump 190 for pumping the recovered oil or refined fuel from the collection tank 86. When a certain level is reached, the pump 190 is activated to pump the recovered oil from the tank 86.

A safety float switch is provided on the collection tank 86 and includes two contact pairs 192, 193. The first contact pair 192 controls an auxiliary pump relay 194. The relay 194 has a pair of contacts 196, which switch power to the actual auxiliary pump motor 198 (the function of contact pair 193 is described below).

A pair of nozzle line heaters 201 are provided for the feed lines of the burners.

The relay 107a has four pairs of contacts 202, for controlling the power supply to fan motors 204 of the fans 92. It is to be noted that all the fan motors are connected between the supply lines 100, 101.

The other four fan motors have their power supply controlled by the timers 177, 178. The overall effect of this is to ensure that, on switching the apparatus on, two fan motors 204 start up initially, and the other fan motors start up in pairs, at four second intervals, to prevent overloading of the supply circuits.

The relay 180 has four contact pairs 206 controlling the power supply to fan motors 208; and the relay 181 has contact pairs 210 controlling the power supply to fan motors 212.

A line 218 is a main control line and includes a key operated switch 240, which is opened when the chamber 22 is opened for cleaning, to prevent burner operation during cleaning. An emergency on/off switch 242 is provided, for quickly shutting the apparatus down.

The line 218 splits, with one branch connected through a momentary motor start switch 222 and a motor control relay 224. Another branch includes a further safety snap disc 246 which is normally closed but opens above 130° F., and which is mounted on the float tank or chamber 336. The high level safety float switch 345 for the level in the float chamber or tank 336 and a safety float switch 193 on the collection tank 86 are connected in series. The safety float switch 193 is associated with the switch 192, and if activated, the apparatus will require manual reset. In effect, this pair of switches ensures that the burners cannot be turned on unless these levels are below upper preset safety levels. It is to be noted that a variety of safety switches could be inserted here, for example, ceiling temperature sensors. The relay 224 closes a pair of contacts 226 which in turn activates a secondary control relay 228. This latches the relay 224 in an operating state, assuming the other switches are closed.

The relay 228 closes a pair of contacts 229 in a line 220. The connection at 220A is connected to the burner circuit 110 at 110A.

The bake mode switch 250 is further connected to a pair of contacts 254 of the relay 107b, these contacts being normally closed. In other words, the contacts are opened when the fans are operating. The contacts 254 are in turn connected through to a bake timer 270.

For bake operation the relay 228 closes a pair of contacts 274 in a line including a bake timer switch 276. The bake timer switch is usually open, but is closed when the bake timer determines that the bake operation has been completed.

The bake timer switch 276 and also the bake override switch 144b are connected to the control relay 148, which controls the contact pairs 140-143. Activation of the 148 has the effect of powering the blower motors 146, 147 and disconnecting control of these motors from the flame detectors 138, 139.

A further bake timer switch 278 is connected to the lines including the control relays 130, 132 for the burner blower motors. This switch is normally closed but is opened by the bake timer 270. The control relay 228 additionally controls the contacts 228a enabling the power supply to the supply pump motors. It also controls contact pair 280, which energizers a temperature control display 282.

To ensure discharge of exhaust gases, an exhaust fan 290 is provided in an exhaust gas duct.

In use of the apparatus, during initial start up, fresh water vapour and then usually a large volume of the more volatile constituents of the waste oil evaporate quickly. This effectively causes a surge through the condensing unit 4. This is accommodated by the float switches 114, 115 and the timer 122. When the float switches 114, 115 detect an excess level, then the power to the burner circuit control relay 120 is switched through the timer 122. The timer is set for predetermined on and off periods. Here it is set for 10 seconds on, alternating with 40 seconds off. This maintains the temperature in the chamber 22, whilst reducing its output, thereby allowing excess condensate to flow out of the heat exchanger or condensing unit. It has been found in practice that, during initial start up, there will be numerous periods where the burners are shut down by the switches 114, 115, with the period between shut downs increasing, until all the volatiles have passed through and the burners can operate continuously without control by timer 122.

In use, the apparatus is operated for a certain period of time, with waste oil being continuously supplied to the evaporation chamber 22. Simultaneously, the tank 86 is periodically emptied, as it fills up. This causes the amount or level of solids or contaminants in the evaporation chamber 22 to build up. During this time the temperature controller 128 is set to a desired temperature. Practically, it has been found that the apparatus will run at an almost constant temperature, depending on the feedstock, and the controller can be set to some margin above the actual operating temperature.

After some time, the build up of solids in the chamber 22 will require the apparatus to be shut down. The drainage tank 290 is provided to enable the level of solids to be monitored. The valves 292 and 296 are opened to permit a sample to flow from the chamber 22 into the drainage tank 290. The valve 296 permits equalization of vapour pressure in the drainage tank 290 and the chamber 22. With the drainage tank 294 filled, the valve 292 is closed and the valve 298 opened to permit a measured quantity to be drawn off into a small steel vessel. This is then heated in an oven to drive off all liquids and vapours. It is then weighed to determine the weight of the solids therein. As the original sample volume was known, the percentage of solids can be determined. In this way, the build up of solids can be monitored, and once the level becomes too great, the apparatus will need to be shut down and cleaned. The exact level of solids that can be tolerated will depend upon the configuration of the chamber 22, and in particular, the means for supplying heat to it. The build up of solids acts as an insulator to inhibit heat transfer from the hot gases around the chamber 22 to the liquid within it. It is proposed to provide pipes running through the chamber 22 through which hot gases would pass. This would improve the heat transfer and permit a greater level of solids to build up within the chamber 22.

Once it is determined that the maximum allowable level of solids is present, then the supply of waste oil is turned off and a bake mode is started, by closing the switches 250, 251. The relay 252 is activated and opens contacts 252a, to disable the three supply pumps 318, 322 and 326 . . . . The contacts 254 will be opened, preventing the bake timer from starting a timing operation.

At this time, the burners can continue operation. The low level float switch 340 has have been disabled, so that the waste oil level can be dropped to below that usually permitted. The fans will continue to operate, so long as the snap discs 104 sense a temperature in excess of that set.

When the heat exchanger 4 has cooled sufficiently, indicating that oil production has nearly ended, the snap discs 104 will open, the relay 107b will then no longer be activated closing contact pair 254, and hence activating the bake timer 270. The temperature in the evaporation chamber 22 is then raised to a final, baking temperature to remove as much as possible of the volatile or liquid components in the evaporation chamber 22. This temperature is set by the temperature controller 128. The controller 128 could be initially set for a temperature of 900° F. For the final baking step, where the sludge supply is turned off, the temperature controller 128 could be set for 1300° F.

The effect of this is to leave behind a solid, cake-like material which can readily be dug out from the evaporation chamber 22. This baking step is carried out until no further volatiles are being condensed and collected in the condensation unit 4, as determined by the bake timer 270.

When the apparatus is sufficiently cool, the access door 34 is opened, to enable the solid residue to be removed. The access door 30 will then be closed, and the process can be restarted with another batch of sludge.

At the end of the bake time, the switch 276 is closed and switch 278 opened. This has the effect of turning on the blower motors, to promote cooling of the evaporation chamber 22. The temperature controller 128 is isolated, to prevent operation of the burners.

With the contacts 276 closed relay 148 is activated. This in turn ensures that the motor blowers are powered through contacts 142, 143 to cool the chamber 22.

A number of tests have been carried out using an apparatus functionally similar to that described above. Since these tests have been carried out, minor changes have been made to the apparatus, e.g. altering the configuration of the chamber 22 and condensation ducts and changes to the control circuitry. Fuel used was either number two fuel oil or a fuel oil, similar to diesel fuel, generated by the apparatus of my earlier application Ser. No. 246,834. Propane or other fuels could alternately be used. One reason for this is to ensure that the sludge does not become directly involved in the combustion process, which could result in the release of heavy metals into the atmosphere.

Initial testing was carried out by the Province of New Brunswick Research and Productivity Council.

During these tests, gases were monitored for: carbon oxygen, carbon monoxide; oxides of nitrogen; carbon dioxide; and sulphur dioxide. Further, the flue gas temperature, smoke number, flue draft, relative humidity and ambient temperature were also recorded. A sample of the sludge inputted into the apparatus, a sample of the distillate or recovered oil and a sample of the residue left in the evaporation chamber 22 were retained for chemical analysis. The intention of this exercise was to determine whether or not metals originally found in the sludge had been concentrated in the solid residue left.

The chemical analysis consisted of the following:

Appearance, Odour, % water, % ash, % sulphur, % carbon, % hydrogen, % nitrogen, % oxygen (by difference), Gross heat of combustion (BTU/lb), Specific gravity @ 77°/77° F. and 60°/60° F. , API gravity (calculated) Cloud point °F., Pour point °F., Flash point °F., Viscosity @ 40° C., 50° C., @ 100° C. - cSt).

Aluminum, Cadmium, Copper, Chromium, Iron, Lead, Molybdenum, Silicon, Sodium, Vanadium, Zinc.

| b) Ash | | |
|---|---|---|
| Aluminum | Lead | Tin |
| Antimony | Lithium | Titanium |
| Arsenic | Magnesium | Tungsten |
| Barium | Manganese | Vanadium |
| Bismuth | Molybdenum | Yttrium |
| Boron | Nickel | Zinc |
| Cadmium | Phosphorus | |
| Chromium | Potassium | |
| Cobalt | Rubidium | |
| Copper | Silver | |
| Iron | Sodium | |
| Lanthanum | Strontium | |

The average results of the flue gas testing, i.e. the flue gases exiting through the exhaust opening 36 and associated stack are given in the table 1 below:

TABLE 1

| Average Results of Flue Gas Testing | | | | | | |
|---|---|---|---|---|---|---|
| CO (%) | $O_2$ (%) | $CO_2$ (%) | $SO_2$ (ppm) | NO (ppm) | Tstack (°F.) | TAmbient (°F.) |
| 0.043 | 10.990 | 7.766 | 61.5 | 13.8 | 744.3 | 72.3 |
| 0.058 | 10.891 | 7.723 | 59.7 | 15.8 | 799.7 | 67.9 |

| Smoke Number | Excess Air (%) | Efficiency (%) | Emissions (g/Kg Fuel) | | | |
|---|---|---|---|---|---|---|
| | | | CO | $SO_2$ | NO | S |
| 1 | 104.8 | 63.7 | 12.48 | 4.08 | 0.43 | 2.04 |
| 0.5 | 102.4 | 61.6 | 16.64 | 3.92 | 0.49 | 1.96 |

Chemical analysis of the sludges, oils and residues involved is given in the following table 2:

TABLE 2

| | Chemical Analyses of Sludges, Oils, and Solid Residue (ppm) | | | | | | | |
|---|---|---|---|---|---|---|---|---|
| | Sludge 1 | Refined Oil 2 | Refined Oil 3 | Refined Oil 4 | Refined Oil 5 | Refined Oil 6 | Solid Residue 7 | Sludge 8 |
| Al | 46.7 | <0.05 | 0.17 | <0.05 | 1 | 1 | 8200 | 223 |
| Cd | 3.38 | <0.05 | <0.05 | <0.05 | <0.05 | <0.05 | <100 | 7.0 |
| Cr | 14.6 | 0.13 | 0.28 | 0.22 | 0 | 1 | 400 | 27 |
| Cu | 141 | 0.04 | 0.09 | 0.07 | 1 | 1 | 2100 | 325 |
| Fe | 997 | 1.61 | 5.96 | 7.63 | <1 | <1 | 16100 | 1470 |
| Mo | 25.2 | <1.0 | <1.0 | <1.0 | <1 | 2 | 500 | 365 |
| Na | 580 | 4.00 | 6.21 | 1.43 | 23.5 | 8.5 | 37100 | 1125 |
| Pb | 1079 | 0.63 | 1.28 | 0.63 | <1 | <1 | 6700 | 4775 |
| Si | 0.01 | <0.01 | <0.01 | <0.01 | 5 | 7 | N.D. | 112 |
| V | <4 | 42 | <4 | <4 | <10 | <10 | 100 | <10 |
| Zn | 3101 | 0.64 | 0.62 | 0.18 | 1.9 | 1.35 | 47400 | 9240 |
| Ag | — | — | — | — | — | — | <100 | 105.6 |
| As | — | — | — | — | — | — | <5 | 164 |
| B | — | — | — | — | — | — | 275 | <2 |
| Ba | — | — | — | — | — | — | 300 | 48 |
| Bi | — | — | — | — | — | — | <100 | 4 |
| Co | — | — | — | — | — | — | <100 | <2 |
| K | — | — | — | — | — | — | 3800 | 4660 |
| La | — | — | — | — | — | — | Not Avail | 9 |
| Li | — | — | — | — | — | — | <100 | 124 |
| Mg | — | — | — | — | — | — | 25500 | 77200 |
| Mn | — | — | — | — | — | — | 9400 | 14090 |
| Ni | — | — | — | — | — | — | 1200 | 116 |
| P | — | — | — | — | — | — | 43500 | 126700 |

TABLE 2-continued

Chemical Analyses of Sludges, Oils, and Solid Residue (ppm)

| | Sludge 1 | Refined Oil 2 | Refined Oil 3 | Refined Oil 4 | Refined Oil 5 | Refined Oil 6 | Solid Residue 7 | Sludge 8 |
|---|---|---|---|---|---|---|---|---|
| Rb | — | — | — | — | — | — | <100 | <200 |
| Sb | — | — | — | — | — | — | <200 | 167 |
| Sr | — | — | — | — | — | — | <200 | 50 |
| Sn | — | — | — | — | — | — | 4000 | 222 |
| Ti | — | — | — | — | — | — | 300 | 71 |
| W | — | — | — | — | — | — | <500 | 788 |
| Y | — | — | — | — | — | — | <100 | 2 |

1. Sludge feedstock from current test program
2. Refined oil from current test program, generated at RPC
3. Refined oil from sludge (1) - submitted by client after RPC tests
4. Refined oil (not from Sludge 1) from sludge refiner, run through waste oil reconditioning furnace
5. Refined oil from waste oil reconditioning furnace - RPC report ICAS/87/407, 1988 - submitted by client
6. Refined oil from waste oil reconditioning furnace - RPC report ICAS/87/407, 1988 - generated at RPC
7. Solid, cake-like residue from current test program
8. Sludge from waste oil reconditioning furnace (associated with 6) - RPC report ICAS/87/407, 1988 generated at RPC Further, the following table 3 gives the physical properties of these sludges and oils involved in the tests.

TABLE 3

Physical Properties of Sludges and Oils

| Parameter | Sludge 1 | Refined Oil 2 | Refined Oil 3 | Refined Oil 4 | Refined Oil 5 | Refined Oil 6 | Sludge 8 | Typical Commercial Diesel/ Furnace Oil |
|---|---|---|---|---|---|---|---|---|
| Appearance | black with particulates | dark brown with particulates | murky brown with particulates | clear, brown with particulates | clear, fluorescent yellow-orange mobile liquid | clear, fluorescent yellow-orange mobile liquid | opaque, black viscous liquid | clear, yellow-orange mobile liquid |
| Odour | light odour of oil or fuel | strong, unpleasant odour | extremely pungent | extremely pungent | acrid, pentrating | acrid, penetrating | acrid, penetrating | characteristic, penetrating |
| Water (%) | 0.24 | 0.16 | 0.08 | 0.22 | 0.15 | <0.05 | 0.05 | 0.05 |
| Ash (%) | 2.47 | <0.05 | <0.05 | <0.05 | <0.01 | <0.01 | 7.12 | <0.01 |
| Sulphur (%) | 0.70 | 0.26 | 0.37 | 0.44 | 0.24 | 0.20 | 1.02 | 0.16 |
| Carbon (%) | 83.02 | 84.75 | 84.15 | 85.00 | 83.74 | 84.62 | 81.76 | 82.84 |
| Hydrogen (%) | 14.26 | 14.62 | 14.68 | 14.83 | 13.04 | 13.27 | 11.75 | 13.06 |
| Nitrogen (%) | 0.14 | 0.18 | 0.08 | 0.08 | 0.04 | 0.05 | 0.28 | 0.03 |
| Oxygen (%) by diff. | <0.05 | 0.19 | 0.72 | <0.05 | 2.79 | 1.81 | (−1.98)* | 3.91 |
| Gross Heat of Combustion (BTU/lb) | 18963 | 19592 | 19512 | 19496 | 19550 | 19548 | 17957 | 19614 |
| Specific Gravity: | | | | | | | | |
| @ 77°/77° F. | 0.9048 | 0.8606 | 0.8459 | 0.8479 | 0.8550 | 0.8525 | 0.9650 | 0.8190 |
| @ 60°/60° F. | 0.9088 | 0.8646 | 0.8499 | 0.8519 | 0.8590 | 0.8565 | 0.9690 | 0.8230 |
| API Gravity (calc) | 24.2 | 32.2 | 35.0 | 34.6 | 32.2 | 33.7 | 14.55 | 40.45 |
| Cloud Point (°F.) | N/A | N/A | N/A | N/A | T.D. | T.D. | T.D. | −34 |
| Pour Point (°F.) | −20 | −12 | −22 | <−25 | −5 | −5 | +10 | −40 |
| Flash Point (°F.)** | +108 | +8 | −12 | +3 | 85 | 95 | >220 | 100 (min) |
| Viscosity: | | | | | | | | |
| @ 40° C. (cSt) | 78.26 | 12.19 | 7.525 | 3.027 | 7.54 | 7.42 | 251.5 | — |
| @ 50° C. (cSt) | 49.59 | 9.083 | 5.875 | 2.510 | 5.77 | 5.69 | 156.4 | 1.5 |
| @ 100° C. (cSt) | 12.76 | 3.003 | 2.238 | 1.206 | 2.23 | 2.18 | 25.14 | — |

N/A = Not applicable
T.D. = Too dark to observe
*The ash is very high for an oil sample and the ash components would be present as oxides, thereby seriously skewing the equation used to obtain "oxygen, by difference"
**Pensky-Martens Closed Cup With regard to the designations used, Sludge 1 refers to the sludge used during this test, whilst sludge 8 refers to a sludge generated by use of the apparatus of my earlier application Ser. No. 246,834, which had been previously analyzed. Comparison of the two indicates some significant differences. Sludge 8 contains significantly higher levels of aluminum (4.8 times) molybdenum (14.5 times) and lead (4.4 times) than sludge 1. Other metals were found at higher concentrations as well.

Refined oils 2 and 3 were produced from sludge 1, with oil 2 being produced by an independent research organization (the Research and Productivity Council at New Brunswick, Canada) and oil 3 being produced by the applicant. The metal concentrations in oil 2 are 1.5 and 4 times lower than in oil 3. Oil 4 was refined oil produced by the sludge refining apparatus of the present invention and then run through the waste oil conditioning furnace of my earlier application Ser. No. 246,834. This shows that, perhaps not surprisingly, there is no significant reduction in metal levels occurring as a result of this extra processing; in effect, since the metals are removed to a significant extend by the first processing step, then additional processing has not effect. However, bear in mind that refined oil 4 was derived from sludge 1, and so a direct comparison is not possible.

The data for oils 5 and 6 were generated by a previous test program, i.e. they are carried out on oils generated by the apparatus of my earlier invention. This shows that oils 2, 3 and 4 are all generally similar with oils 5 and 6.

A comparison of sludges 1 and 8 shows that the current sludge contains less ash and sulphur than the previous sludge, at the same time its calorific value is higher, whilst its specific gravity and viscosity are lower than those of sludge 8.

Refined oils 2 and 3 give very similar properties, although both the specific gravity and the viscosity was somewhat higher in the former case. Refined oil 4, which is not derived from sludge 1, also yielded similar characteristics, with the exception of its appearance. It was a clear, brown liquid with particulates whilst oils 2 and 3 were dark brown and murky brown, respectively, with particulates. This can no doubt be accounted for by the fact that oil 4 was further processed by the apparatus of my earlier invention.

With regard to the flue gases, CSA standard B140.0, general requirements for oil burning equipment, requires that the level of carbon monoxide in the flue gas not exceed an 0.04% by volume. The levels generated by the apparatus of the present invention measured, on average not 0.051%. It must be realized however that the CSA recommended level is intended for oil burner testing. This number is related to performance rather than environmental considerations. By adjusting the burner to minimize the formation of carbon monoxide, it should be possible to reduce the emissions below the current levels. It should also be realized that this standard is a Canadian standard, and other standards would apply in other jurisdictions, and this comment applies to a number of the parameters discussed below. For oxygen and carbon dioxide the values obtained, namely 10.9% and 7.7% respectively are considered reasonable for the type of burner employed. These levels correspond to an average calculated excess air of 104%. The levels recorded for SO2 and NO namely 61 ppm and 15 ppm are considered normal and give no particular problem.

The total flue gas temperature of 702° F. was within the limits set by CSA standard B104.4 oil fired warm air furnaces, clause 7.2.1.4.2. This stipulates that the maximum flu gas temperature should be between 300° and 750° F. Whilst the value recorded is high it is within the limits.

All of the refined oils, whether produced by the apparatus of the present invention, my earlier apparatus, or a combination of the two, showed results which were consistent. The only significant difference was in the area of appearance with those oils derived from my earlier apparatus demonstrating a clarity not found in the dark or murky brown oils from the present apparatus.

The distillate or recovered oil produced by my apparatus compares favourably to commercial light fuel oils with respect to their elemental compositions and calorific values. However, there are differences in the areas of viscosity and specific gravity (the values being higher for the distillate or recovered oil), and pour points/flash points. This can be attributed to the fact that commercial light fuels consist of saturated paraffinic aliphatic hydrocarbons, with a narrower range of boiling points, while the distillate analyzed possessed a mixture of saturated and unsaturated aliphatic paraffinic hydrocarbons, with a very wide range of boiling points.

With regard to the solid residue that is left behind, the apparatus concentrates this into a cake-like residue, with a composition given in table 2. Conceivably, with the solid material so-concentrated, it would become both more economic and feasible to process this. In particular, it is envisaged that it could be processed to recover the metals contained in it.

As discussed below, other tests have determined that this ash cake is a toxic non-leachate, so that it could be disposed or used by, for example, combining it in asphalt.

The solid material produced by the apparatus contains recoverable amounts of zinc, phosphorous, magnesium, calcium and lead. The strategic metal molybdenum is present at around 8.2 pounds per ton. Accordingly, this black, cake-like solid is suitable for reprocessing. The only disadvantage is that when processing waste lubricating oil and the like, the solids represent a relatively small amount of the oil. Consequently, a typical installation would generate approximately a truck load of solid material in one year. In large urban areas where there could be a requirement for a large number of apparatus or refiners in accordance with the present invention and my earlier invention to operate, it is anticipated that it would prove feasible to operate a central collection facility for collecting and further processing the solid waste from the present apparatus.

A further series of tests as carried out (by OCL Services Ltd. of Dartmouth, Nova Scotia, Canada) with a general objective of determining if operation of the apparatus would generate emissions having a serious environmental impact. As detailed below, the tests started with a waste oil which meet current Waste Oil Regulations, at least in Canada, and found that the process generated only one end-product waste stream which could possibly be classified as an environmental hazard. This was an ash cake solid waste from the apparatus of the present invention. It was further determined that this ash cake is not leachable, and hence, could be classified as toxic non-leachate, as detailed below.

The following table 4 shows the analysis of the initial product, listing a typical waste oil.

TABLE 4

| Analysis of Initial Raw Product | | |
|---|---|---|
| Item | Value | Units |
| PCB (as Aroclor 1260) | <1 | mg/kg |
| Arsenic | <0.05 | mg/kg |
| Lead | 20.8 | mg/kg |
| Cadmium | 0.46 | mg/kg |
| Chromium | 1.4 | mg/kg |
| Zinc | 757 | mg/kg |
| Sediment, toluene fraction | 4.21 | % |
| Ash | 0.56 | % |
| Organic chloride | 382 | mg/kg |
| Pinsky-Martens Flash Point; boils @ | 100 | °C. |
| Water content (side arm) | 3.0 | % |
| Specific Gravity @ 60° F. | 0.8860 | — |
| Sulphur | 0.56 | % |
| Odour | solvent (possibly varsol) | |
| Distillation | | |
| Initial BP: 100° C. 10% (188° C.) 20% (280° C.) 30% (310° C.) 40% (321° C.) 50% (327° C.) 60% (328° C.) 70% (328° C.) 80% (324° C.) 90% (320° C.) end point reached at 328° C. with 60% recovered | | |

A comparison of this analysis with Waste Oil Environmental Criteria (Canadian Standards) shows that the oil meets the environmental criteria in all respects. The concentration of PCBs was less than 1 mg/kg (Criterion equals 5 mg/kg). Concentrations of the metals were low and also met the relevant criteria.

Tables 5 shows an analysis of the residual solids or ash cake produced by the apparatus. As shown, the cake was analyzed for 5 trace metals. As expected, the metal contaminants in the original feedstock were concentrated in the ash cake residue, particularly the lead and zinc. Concentrations were high, and in all likelihood, the ash could be considered a hazardous material.

TABLE 5

| | Residual Solids Analysis | | | |
|---|---|---|---|---|
| Item | Ash Cake #1 | Ash Cake #2 | Centrifuge Sludge #1 | Units |
| Arsenic | 2.50 | 0.19 | 0.34 | mg/kg |
| Lead | 1160 | 747 | <1.5 | mg/kg |
| Cadmium | 32.2 | 27.8 | <0.20 | mg/kg |
| Chromium | 110 | 87.2 | <0.50 | mg/kg |
| Zinc | 35,900 | 61,728 | 0.64 | mg/kg |

Accordingly, a standard leachate test, as defined in the Canadian Transport of Dangerous Goods Act was carried out. These results are shown in table 6.

TABLE 6

| | Leachate Test of Ash Cakes | | | |
|---|---|---|---|---|
| Item | Ash Cake #1 | Ash Cake #2 | Leachate Criteria | Units |
| pH | 4.10 | 4.05 | — | — |
| Arsenic | <0.005 | <0.005 | 5.0 | mg/L |
| Lead | <0.30 | <0.30 | 5.0 | mg/L |
| Cadmium | <0.01 | <0.1 | 5.0 | mg/L |
| Chromium | <0.10 | <0.10 | 0.50 | mg/L |
| Zinc | 1.8 | 1.9 | no value | mg/L |

The leachate results are well within the criteria of that Act, and hence the material can be classified as a non-toxic leachate.

It can be noted that the trace metal content in the ash cake will be a function of the feed stock and accordingly, there are likely to be significant differences depending upon the raw oil input.

Table 7 shows a different product analysis.

TABLE 7

| | Refined Product Analysis | | |
|---|---|---|---|
| Item | Pre-Processed Oil Test #1 (1674-6) | Pre-Processed Oil Test #2 (1674-1) | Units |
| Flash Point | 94.0 | <0, 111 | °C. |
| Viscosity @ 20° C. | 11.8 | 5.26 | centistoke |
| Caloric Value | 19,228 | 19,547 | Btu/lb |
| Elemental Analysis | | | |
| H | 12.85 | 12.57 | % |
| C | 86.62 | 86.27 | % |
| N | 0.06 | 0.01 | % |
| O | 0.42 | 1.09 | % |
| S | 0.29 | 0.32 | % |
| Ash @ 775° C. | <0.005 | <0.005 | % |
| Arsenic | 0.21 | 0.25 | mg/kg |
| Lead | <1.0 | 2.0 | mg/kg |
| Chromium | <1.0 | <1.0 | mg/kg |
| Cadmium | <0.2 | <0.2 | mg/kg |
| Zinc | — | <0.2 | mg/kg |
| Colour (D1500/96 ASTM) | <3.0 oil | 4.0 oil | — |
| Burning carbon residue | 0.051 | 0.045 | % |
| Pour point | −16 | −21 | °C. |
| Odour | burnt | burnt | — |
| PCB (as Aroclor 1260) | <1 | 4.8 | mg/kg |
| Total organic chlorides | <60 | 338 | mg/kg |

TABLE 7-continued

| | Refined Product Analysis | | |
|---|---|---|---|
| Item | Pre-Processed Oil Test #1 (1674-6) | Pre-Processed Oil Test #2 (1674-1) | Units |
| Water content | <0.05 | <0.05 | % |
| Distillation Range | | | |
| initial BP | 200 | 60 | °C. |
| 10 mL | 236 | 162 | °C. |
| 20 mL | 267 | 205 | °C. |
| 30 mL | 294 | 244 | °C. |
| 40 mL | 315 | 284 | °C. |
| 50 mL | 331 | 315 | °C. |
| final BP | 331 | 328 | °C. |
| recovery | 63.0 | 61.0 | % | test #1 represents material centrifuged and adjusted for flash point
test #2 represents material only centrifuged. Result for flash point shows result before and after flash point adjustment.

Test No. 1 shows the material that was subsequently centrifuged and adjusted, by the applicant, as it was realized that the oil had a relatively low flash point. This gave a flash point of 94° C. Test No. 2 shows oil which was just centrifuged, without flash point adjustment. The flash point was then adjusted. Two flash point figures are given, before and after adjustment, showing an increase in flash point from less than 0° C. to 111° C. Environmentally, this is of no great significance, but it does affect the classification of the oil and conditions under which it would have to be transported.

The sludge by-product generated by centrifuging was also tested and met relevant environment criteria. This sludge could be input back into the apparatus for further processing.

The characteristics of the oil set out in table 7 is equivalent to a no. 4 or 5 fuel oil, in accordance with ASTM Standards, and accordingly, this product could be used as such.

Alternatively, as detailed in my co-pending application, filed simultaneously herewith, for an apparatus and method for reclaiming waste oil, the output from the present apparatus could be further processed in that apparatus, to generate an oil equivalent to a diesel fuel oil. The contents of that other application are hereby incorporated by reference.

It can be noted that the concentrations of metals and other contaminants are low in the recovered oil.

During testing, the output of the stack or exhaust was monitored. It was shown that the CO emissions were low, indicating high burner efficiency.

Preferably, the relays, etc., of the control circuit are replaced by a programmable logic controller (PLC). Such a PLC is an Omron C60, and there follows a list of operating instructions for that PLC.

| <<< SX 402 80 WASTE OIL REFINING SYSTEM REV: 7.1 (c) 1991 | | | |
|---|---|---|---|
| ADDRESS | MNEMONIC | OPERAND | COMMENT |
| 00000 | LD | 00002 | STRT |
| 00001 | LD NOT | 00003 | SAFE RES |
| 00002 | KEEP | 00303 | |
| 00003 | LD | 00004 | LLFS |
| 00004 | LD | 00307 | BLOW OVR |
| 00005 | OR | 00005 | |
| 00006 | KEEP | 00301 | |
| 00007 | LD | 00303 | SAFE LCH |
| 00008 | AND NOT | 00008 | SPLO KEY |
| 00009 | AND NOT | 00301 | SPLO LCH |
| 00010 | AND NOT | 00006 | F130 |
| 00011 | OUT | 00100 | SP OUT |
| 00012 | LD NOT | 00006 | F130 |

-continued

<<< SX 402 80 WASTE OIL REFINING SYSTEM REV: 7.1
(c) 1991

| ADDRESS | MNEMONIC | | OPERAND | COMMENT |
|---------|----------|---|---------|---------|
| 00013 | OR | | 00007 | SAIL SW. |
| 00014 | AND | | 00303 | SAFE LCH |
| 00015 | AND | | 00004 | LLFS |
| 00016 | AND | | 00008 | SPLO KEY |
| 00017 | AND | | 00301 | SPLO LCH |
| 00018 | AND | | 00009 | L130 |
| 00019 | AND | | 00010 | L130 |
| 00020 | AND | | 00011 | SURF FLT. |
| 00021 | AND | NOT | 00012 | FLOW |
| 00022 | AND | | 00207 | BAKE TMO |
| 00023 | AND | NOT | 00209 | FLOW BKU |
| 00024 | AND | | 00204 | TEMP |
| 00025 | OUT | | 00101 | BURN OP1 |
| 00026 | LD | | 00012 | FLOW |
| 00027 | OR | | 00209 | FLOW BKU |
| 00028 | AND | | 00303 | SAFE LCH |
| 00029 | AND | | 00007 | SAIL SW. |
| 00030 | AND | | 00004 | LLFS |
| 00031 | AND | | 00008 | SPLO KEY |
| 00032 | AND | | 00009 | L130 |
| 00033 | AND | | 00010 | L130 |
| 00034 | AND | | 00011 | SURG FLT. |
| 00035 | AND | | 00301 | SPLO LCH |
| 00036 | AND | | 00204 | TEMP |
| 00037 | AND | | TIM 003 | FLOW TIM |
| 00038 | AND | | 00207 | BAKE TMO |
| 00039 | OUT | | 00102 | BURN FL2 |
| 00040 | LD | | 00012 | FLOW |
| 00041 | OR | | 00209 | FLOW BKU |
| 00042 | AND | NOT | TIM 002 | FLOW TIM |
| 00043 | TIM | | 003 | |
| | | | # 0100 | |
| 00044 | LD | | TIM 003 | FLOW TIM |
| 00045 | TIM | | 002 | |
| | | | # 0300 | |
| 00046 | LD | | 00303 | SAFE LCH |
| 00047 | AND | | 00014 | ½ GPF |
| 00048 | AND | | 00013 | ALRM INP |
| 00049 | AND | NOT | 00015 | BAKE ON |
| 00050 | OUT | | 00103 | ½ GPO |
| 00051 | LD | | 00303 | SAFE LCH |
| 00052 | AND | | 00006 | F130 |
| 00053 | AND | | 00200 | 1.5 GPF |
| 00054 | AND | NOT | 00015 | BAKE ON |
| 00055 | LD | | 00303 | SAFE LCH |
| 00056 | AND | | 00202 | SERV TOH |
| 00057 | AND | | 00014 | ½ GPF |
| 00058 | AND | NOT | 00015 | BAKE ON |
| 00059 | OR | LD | | |
| 00060 | OUT | | 00104 | 1.5 GPO |
| 00061 | LD | | 00303 | SAFE LCH |
| 00062 | AND | | 00006 | F130 |
| 00063 | AND | | 00201 | 2GPM FLT |
| 00064 | AND | NOT | 00015 | BAKE ON |
| 00065 | OUT | | 00105 | 2GPM OPT |
| 00066 | LD | | 00015 | BAKE ON |
| 00067 | AND | NOT | 00006 | F130 |
| 00068 | AND | | 00303 | SAFE LCH |
| 00069 | OUT | | 00106 | BAKE TMS |
| 00070 | LD | | 00006 | F130 |
| 00071 | TIM | | 001 | |
| | | | # 0040 | |
| 00072 | LD | | 00006 | F130 |
| 00073 | AND | | TIM 001 | FAN DTM |
| 00074 | OUT | | 00109 | FAN DO2 |
| 00075 | LD | | 00006 | F130 |
| 00076 | OUT | | 00110 | FAN OP1 |
| 00077 | LD | | 00205 | REF FLT |
| 00078 | TIM | | 004 | |
| | | | # 0450 | |
| 00079 | LD | | 00205 | REF FLT |
| 00080 | AND | | TIM 004 | REF TIM |
| 00081 | OUT | | 00111 | REF OUT |
| 00082 | LD | | 00206 | AUX. FLT |
| 00083 | OUT | | 00300 | AUX. OUT |
| 00084 | LD | | 00208 | BAKE TUP |
| 00085 | AND | | 00013 | ALRM INP |
| 00086 | AND | | 00303 | SAFE LCH |
| 00087 | OUT | | 00307 | BLOW OVR |
| 00088 | LD | | 00206 | AUX. FLT |
| 00089 | LD | | 00002 | STRT |
| 00090 | KEEP | | HR 0001 | |
| 00091 | LD | | 00203 | HIGH STA |
| 00092 | LD | | 00002 | STRT |
| 00093 | KEEP | | HR 0002 | |
| 00094 | LD | | 00209 | FLOW BKU |
| 00095 | LD | | 00002 | STRT |
| 00096 | KEEP | | HR 0003 | |
| 00097 | LD | | 00210 | |
| 00098 | LD | | 00002 | STRT |
| 00099 | KEEP | | HR 0004 | |
| 00100 | LD | | HR 0001 | REFS FAL |
| 00101 | OR | | HR 0002 | HIGH STA |
| 00102 | OR | | HR 0003 | FLOW BKU |
| 00103 | OR | | HR 0004 | STAT |
| 00104 | OUT | | 00310 | AMBR FTP |
| 00105 | LD | | 00301 | SPLO LCH |
| 00106 | AND | | 00303 | SAFE LCH |
| 00107 | OUT | | 00308 | SPLO STA |
| 00108 | LD | | 00209 | FLOW BKU |
| 00109 | AND | | 00303 | SAFE LCH |
| 00110 | OUT | | 00311 | FLNR STA |
| 00111 | LD | | HR 0001 | REFS FAL |
| 00112 | OUT | | 00312 | REFS FAL |
| 00113 | LD | | HR 0002 | HIGH STA |
| 00114 | OUT | | 00313 | HIGH STA |
| 00115 | LD | | HR 0003 | FLOW BKU |
| 00116 | OUT | | 00314 | FBKU STA |
| 00117 | LD | | HR 0004 | STAT |
| 00118 | OUT | | 00315 | STAT |
| 00119 | END | | | |

I claim:

1. An apparatus for reclaiming a useful oil product from a waste oil, the apparatus comprising: an evaporation chamber, including an inlet for the waste oil, and an outlet for vaporized oil; heating means for heating the evaporation chamber to vaporize oil from the waste oil; a first float means for monitoring the level of the waste oil in the evaporation chamber; pump means connected to the inlet of the evaporation chamber for pumping waste oil into the evaporation chamber, and connected to and controlled by the first float means, to maintain the waste oil level in the evaporation chamber at a desired level; a heating control circuit connected to and controlling the heating means; and a second float means mounted so as to be subject to the oil level in the evaporation chamber, and connected in the heating control circuit, for opening the control circuit if the oil level exceeds predetermined upper and lower limits.

2. An apparatus as claimed in claim 1, which includes an evaporation unit including the evaporation chamber, which evaporation unit comprises a housing, in which the evaporation chamber and the heating means are mounted, wherein the heating means generates heat by combustion of a fuel to produce hot exhaust gases, and the housing includes an exhaust opening for the exhaust gases from the heating means and a connection duct for the vaporized oil connected to the outlet of the evaporation chamber.

3. An apparatus as claimed in claim 2, wherein the evaporation chamber is spaced from walls of the housing to permit free circulation of hot gases around the evaporation chamber.

4. An apparatus as claimed in claim 2, wherein the evaporation chamber is spaced from the walls of the housing, and wherein the housing includes an end wall having an access opening extending through to the evaporation chamber, and an access door in that access opening providing access to the interior of the evaporation chamber for removing solids therefrom.

5. An apparatus as claimed in claim 3 or 4, wherein the heating means comprises two burners located within the housing below the evaporation chamber, at either end thereof, and a temperature controller for controlling the burners to maintain a desired temperature within the evaporation chamber.

6. An apparatus as claimed in claim 1, which further includes a condensation unit connected to the outlet of the evaporation chamber and having an outlet for condensed, recovered oil, and a collection tank for recovered oil to which the outlet of the condensation unit is connected.

7. An apparatus as claimed in claim 6, wherein the condensation unit comprises a plurality of layers of ducts providing an elongate path for the vaporized oil and extended heat transfer surface, a condensation unit housing enclosing at least some of the ducts, and fans mounted on the housing for moving air through the housing and over the ducts to remove heat from the vaporized oil and condense the oil.

8. An apparatus as claimed in claim 7, wherein the fans are mounted on top of the housing.

9. An apparatus as claimed in claim 7 or 8, wherein each duct is a generally rectangular section, and the ducts in each layer are arranged parallel to one another and connected at their ends to form a zig zag path for the oil.

10. An apparatus as claimed in claim 8, which includes a safety float switch on the collection tank, for preventing over filling of the collection tank which safety float switch is connected in the heating control circuit for opening the heating control circuit if the level in the collection tank exceeds a predetermined level.

11. An apparatus as claimed in claim 6, wherein the first float means includes float switches for sensing the level in the evaporation chamber and connected to the pump means for activating the pump means to maintain the waste oil level in the evaporation chamber between desired upper and lower limits.

12. An apparatus as claimed in claim 11, which includes a separate float tank on which the first and second float means and the float switches are mounted and a service tank connected between the float tank and the inlet of the evaporation chamber, with the pump means being connected to the service tank.

13. An apparatus as claimed in claim 12, wherein the service tank is connected to the float tank and the inlet of the evaporation chamber by connection pipes, and baffles are provided in the connection pipes to substantially reduce convective flow of waste oil and heat transfer between the service tank, float tank and evaporation chamber.

14. An apparatus as claimed in claim 13, wherein the pump means comprises a plurality of individual pumps of different capacities, and the first float means comprises a plurality of corresponding individual pump float switches which are provided on the float tank, and wherein the pump float switch for each pump is located above the pump float switches for pumps of larger capacity.

15. An apparatus as claimed in claim 14, wherein a pump of the least capacity is connected to the service tank via a pump supply pipe, which extends through the service tank, through the connection pipe connected to the evaporation chamber inlet, and through the evaporation chamber inlet into the evaporation chamber.

16. An apparatus as claimed in claim 12 or 15, wherein the pump means includes an initial supply pump connected directly to the evaporation chamber, and float switch means on the float tank, located below the other float switches, for locking out the initial supply pump once the waste oil in the evaporation chamber reaches a predetermined level.

17. An apparatus as claimed in claim 11, which includes a drainage tank connected to the evaporation chamber, to permit a sample of the evaporation chamber contents to be drawn off for analysis.

18. An apparatus as claimed in claim 11, wherein the heating means comprises at least one burner located within the housing below the evaporation chamber, which burner includes a fan for supplying combustion air thereto, and a temperature controller located in the heating control circuit for controlling the burner to maintain a desired temperature within the evaporation chamber.

19. An apparatus as claimed in claim 18, which includes a flow control float switch means mounted on the condensation unit for detecting excess flow therethrough, which float switch means is connected in the heating control circuit for interrupting operation of the burner to reduce the output of the evaporation chamber, to permit the excess flow to clear the condensation unit.

20. An apparatus as claimed in claim 18, which includes a bake override switch means for interrupting power supply to the pump means to prevent further supply of waste oil to the evaporation chamber, and for overriding the second float means which opens the burner circuit in the absence of sufficient waste oil in the evaporation chamber, to permit operation of the burners to bake residual contents of the evaporation chamber.

21. An apparatus as claimed in claim 20, which includes a bake timer, that is activated once substantially all of the volatile contents of the evaporation chamber have left that chamber, which bake timer effects operation of the burner fan only for a period of time, to cool the evaporation chamber.

22. An apparatus as claimed in claim 21, which further includes a drainage tank connected to the evaporation chamber, to permit a sample to be removed from the evaporation chamber for analysis.

23. An apparatus as claimed in claim 22, which includes a float tank on which the float switches and the first and second float means, are mounted, a service tank connected to the float tank and the evaporation chamber by connection pipes, and baffles within the connection pipes, to substantially reduce convection flow of waste oil.

24. An apparatus for reclaiming a useful oil product from waste oil, the apparatus comprising: an evaporation chamber, including an inlet for the waste oil, and an outlet for vaporized oil; heating means for heating the evaporation chamber to vaporize oil from the waste oil; supply means for supplying waste oil to the evaporation chamber; a heating control circuit connected to and controlling the heating means; a condensation unit connected to the outlet of the evaporation chamber and having an outlet for condensed, recovered oil; flow sensing means mounted on the condensation unit, for sensing flow therethrough and connected in the heating control circuit, the flow sensing means opening the heating control circuit, to interrupt operation of the heating means, when a flow in excess of a preset limit is detected.

25. An apparatus as claimed in claim 24, wherein the condensation unit comprises a plurality of layers of ducts providing an elongate path for the vaporized oil and an extended heat transfer surface, a condensation unit housing enclosing at least some of the ducts, and fans mounted on the housing for moving air through the housing and over the ducts, to cool the ducts, first temperature sensing means mounted on the ducts, and a power control circuit for the fans connected through the first temperature sensing means, which activates the fans when the sensed temperature exceeds a predetermined value.

26. An apparatus as claimed in 25, wherein the heating control circuit includes a sail switch mounted for detecting air flow provided by the fans, a first switch connected in series with the sail switch, a second switch connected in parallel across the sail switch and the first switch, and wherein the first temperature sensing means is such as to close the second switch to bypass the sail switch when the fans are inoperative, and to close the first switch and open the second switch, to connect the heating control circuit through the sail switch when the fans are operative.

27. An apparatus as claimed in claim 26, which includes a second temperature sensor at the exit of the condensation unit, and connected in the heating control circuit, the second temperature sensor opening the heating control circuit, to interrupt operation of the heating means, when a temperature in excess of a predetermined value is detected at the outlet of the condensation unit.

28. An apparatus as claimed in one of claims 25, 26 or 27, wherein the supply means includes pump means connected to the evaporation chamber for pumping waste oil into the evaporation chamber, which pump means includes a first float, mounted to be subject to oil level within the evaporation chamber, and controlling the pump means to maintain said oil level within predetermined limits, and safety float means connected in the heating control circuit, for interrupting operation of the heating means, if the oil level exceeds predetermined upper and lower limits.

29. An apparatus for reclaiming a useful oil product from waste oil, the apparatus comprising: an evaporation chamber, including an inlet for waste oil, and an outlet for vaporized oil; heating means for heating the evaporation chamber to vaporize oil from the waste oil; supply means connected to the evaporation chamber for supplying waste oil to the evaporation chamber; a heating control circuit connected to and controlling the heating means; a condensation unit providing an elongate path for the vaporized oil and an extended heat transfer surface, connected to the outlet of the evaporation chamber; fans mounted on the condensation unit for moving air over the heat transfer surface; a first temperature sensing means mounted on the condensation unit for detecting the temperature therein; and a fan control circuit, in which the first temperature sensing means is connected, the first temperature sensing means causing the circuit to activate the fans, when the sensed temperature exceeds a predetermined limit.

30. An apparatus as claimed in claim 29, wherein the heating control circuit includes a sail switch connected in series with a first switch, and a second switch connected in parallel to the sail switch and the first switch, the sail switch being mounted to detect air flow through the condensation unit and to close when sufficient air flow is detected, and wherein the first temperature sensing means normally maintains the first switch open and the second switch closed to bypass the sail switch, and when a temperature in excess of the predetermined limit is sensed, activates the fans, closes the first switch and opens the second switch, to connect the heating control circuit through the sail switch.

31. An apparatus as claimed in claim 30, which includes a second temperature sensor at the outlet of the condensation unit, connected in the heating control circuit, the second temperature sensor normally being closed but opening, to interrupt operation of the heating means, when a temperature in excess of a predetermined value is detected.

32. An apparatus for reclaiming a useful oil product from waste oil, the apparatus comprising: an evaporation chamber, including an inlet for waste oil, and an outlet for vaporized oil; heating means for heating the evaporation chamber to vaporize oil from the waste oil; a first float means for monitoring the level of waste oil in the evaporation chamber; a supply means connected to the evaporation chamber for supplying waste oil into the evaporation chamber, and connected to and controlled by the first float means, to maintain the waste oil level in the evaporation chamber at a desired level; a heating control circuit connected to and controlling the heating means; and a bake override circuit for effecting a bake mode and including means for disabling the supply means, and maintaining operation of the heating means, to enable all volatile components to be evaporated out from the evaporation chamber.

33. An apparatus as claimed in claim 32, which includes a second float means mounted so as to be subject to the oil level in the evaporation chamber and connected in the heating control circuit, for opening the control circuit if the oil level exceeds predetermined upper and lower limits, wherein the bake override circuit includes means for overriding the second float means in the bake mode.

34. An apparatus as claimed in claim 33, which includes a condensation unit connected to the outlet of the evaporation chamber, and temperature sensing means mounted on the condensation unit for sensing temperature therein, and wherein the bake override circuit includes a bake timer connected to and controlled by the temperature sensing means, the temperature sensing means commencing operation of the bake timer, when the sensed temperature falls below a predetermined limit.

35. An apparatus as claimed in claim 34, wherein the heating control circuit includes a temperature controller, for regulating the heating means to maintain a desired temperature in the evaporation chamber, and wherein the bake override circuit includes means, for increasing the set temperature to a final bake temperature, in the bake mode after operation of the bake timer.

36. An apparatus as claimed in claim 35, wherein the bake override circuit includes means for disabling operation of the heating means at the end of a time set by the bake timer.

37. An apparatus as claimed in claim 36, wherein the heating means generates heat by combustion of a fuel to reduce hot exhaust gases, and includes a blower means for supplying combustion air thereto, and wherein the bake override circuit includes means for maintaining operation of the blower means at the end of the bake time, to cool the evaporation chamber.

* * * * *